(12) United States Patent
Gibson et al.

(10) Patent No.: US 11,413,684 B2
(45) Date of Patent: *Aug. 16, 2022

(54) DEBINDING OF 3D OBJECTS

(71) Applicant: Desktop Metal, Inc., Burlington, MA (US)

(72) Inventors: Michael A. Gibson, Burlington, MA (US); Alexander C. Barbati, Cambridge, MA (US)

(73) Assignee: Desktop Metal, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/561,628

(22) Filed: Sep. 5, 2019

(65) Prior Publication Data
US 2020/0061705 A1 Feb. 27, 2020

Related U.S. Application Data

(63) Continuation of application No. 16/221,190, filed on Dec. 14, 2018.
(Continued)

(51) Int. Cl.
*B22F 3/10* (2006.01)
*B33Y 40/00* (2020.01)
(Continued)

(52) U.S. Cl.
CPC .......... *B22F 3/1025* (2013.01); *B22F 3/1021* (2013.01); *B22F 10/20* (2021.01);
(Continued)

(58) Field of Classification Search
CPC .... B22F 3/1025; B22F 3/1021; B22F 3/1055; B22F 1/0059; B22F 2003/1057;
(Continued)

(56) References Cited

U.S. PATENT DOCUMENTS 5,033,939 A * 7/1991 Brasel ................. B22F 3/22
  419/37
5,059,387 A * 10/1991 Brasel ................. B22F 1/0059
  419/23

(Continued)

OTHER PUBLICATIONS

International Search Report and Written Opinion issued in International Application No. PCT/US2018/065823, dated Apr. 10, 2019 (17 pages).
(Continued)

*Primary Examiner* — Alexander Markoff
(74) *Attorney, Agent, or Firm* — Oak Law, PLLC; Jonathan D. Hall

(57) ABSTRACT

3D-printed parts may include binding agents to be removed following an additive manufacturing process. A debinding process removes the binding agents by immersing the part in a solvent bath causing chemical dissolution of the binding agents. The time of exposure of the 3D-printed part to the solvent is determined based on the geometry of the part, wherein the geometry is applied to predict the diffusion of the solvent through the 3D-printed part. The 3D-printed part is then immersed in the solvent bath to remove the binding agent, and is removed from the solvent bath after the time of exposure.

20 Claims, 18 Drawing Sheets

Related U.S. Application Data

(60) Provisional application No. 62/599,582, filed on Dec. 15, 2017.

(51) Int. Cl.

| | | |
|---|---|---|
| *B29C 64/165* | (2017.01) | |
| *B29C 64/35* | (2017.01) | |
| *B22F 10/20* | (2021.01) | |
| *B33Y 50/00* | (2015.01) | |
| *B33Y 80/00* | (2015.01) | |
| *B29C 64/386* | (2017.01) | |
| *B29C 64/40* | (2017.01) | |
| *G05B 19/4099* | (2006.01) | |
| *B29C 64/357* | (2017.01) | |
| *B08B 3/08* | (2006.01) | |
| *B29C 64/393* | (2017.01) | |
| *B29C 71/00* | (2006.01) | |
| *B33Y 50/02* | (2015.01) | |
| *B33Y 10/00* | (2015.01) | |
| *B22F 5/10* | (2006.01) | |
| *B22F 10/30* | (2021.01) | |
| *B22F 1/10* | (2022.01) | |
| *B33Y 30/00* | (2015.01) | |
| *G01B 21/08* | (2006.01) | |

(52) U.S. Cl.
CPC ............ *B29C 64/165* (2017.08); *B29C 64/35* (2017.08); *B29C 64/386* (2017.08); *B33Y 40/00* (2014.12); *B33Y 50/00* (2014.12); *B33Y 80/00* (2014.12); *B08B 3/08* (2013.01); *B22F 1/10* (2022.01); *B22F 5/10* (2013.01); *B22F 10/30* (2021.01); *B22F 2202/01* (2013.01); *B22F 2202/07* (2013.01); *B22F 2203/00* (2013.01); *B22F 2998/10* (2013.01); *B22F 2999/00* (2013.01); *B29C 64/357* (2017.08); *B29C 64/393* (2017.08); *B29C 64/40* (2017.08); *B29C 71/0009* (2013.01); *B33Y 10/00* (2014.12); *B33Y 30/00* (2014.12); *B33Y 50/02* (2014.12); *G01B 21/08* (2013.01); *G05B 19/4099* (2013.01)

(58) Field of Classification Search
CPC ...... B22F 2003/1059; B22F 2003/1058; B22F 2203/00; B22F 2998/10; B22F 2202/07; B22F 2202/01; B22F 2999/00; B22F 5/10; B22F 3/008; B22F 10/20; B22F 1/10; B22F 10/30; B22F 10/10; B22F 10/40; B22F 10/70; B33Y 50/00; B33Y 80/00; B33Y 40/00; B33Y 50/02; B33Y 10/00; B33Y 30/00; B29C 64/386; B29C 64/165; B29C 64/35; B29C 64/40; B29C 64/357; B29C 64/393; B29C 71/0009; G05B 19/4099; B08B 3/08; G01B 21/08; Y02P 10/25

See application file for complete search history.

(56) References Cited

U.S. PATENT DOCUMENTS

| | | | |
|---|---|---|---|
| 10,654,102 B2 * | 5/2020 | Gibson | B22F 3/1021 |
| 2005/0233261 A1 | 10/2005 | Slaughter | |
| 2013/0000247 A1 | 1/2013 | Sypeck | |
| 2019/0210106 A1 * | 7/2019 | Gibson | B22F 10/20 |
| 2020/0001363 A1 * | 1/2020 | Gibson | B33Y 40/00 |
| 2020/0061706 A1 * | 2/2020 | Gibson | B22F 10/40 |

OTHER PUBLICATIONS

Zhu et al., "Mathematical model for condensed-solvent debinding process of PIM", Nov. 1, 2003, pp. 487-492, vol. 142, No. 2, Journal of Materials Processing Technology, ELSEVIER (6 pages).

Hwang et al., "Solvent Debinding Behavior of Powder Injection Molded Components Prepared from Powders with Different Particle Sizes", Jan. 1, 2005, pp. 161-167, vol. 36, No. 1, Springer-Verlag, New York (7 pages).

Krauss et al., "A model for PEG removal from Alumina injection moulded parts by solvent debinding", Feb. 1, 2007, pp. 268-273, vol. 182, No. 1-3, Journal of Materials Processing Technology, ELSEVIER (6 pages).

Aboubakry et al., "Identification and numerical simulation of Supercritical fluid debinding of Inconel 718 parts realised by metal injection moulding", Jan. 1, 2017 (6 pages).

* cited by examiner

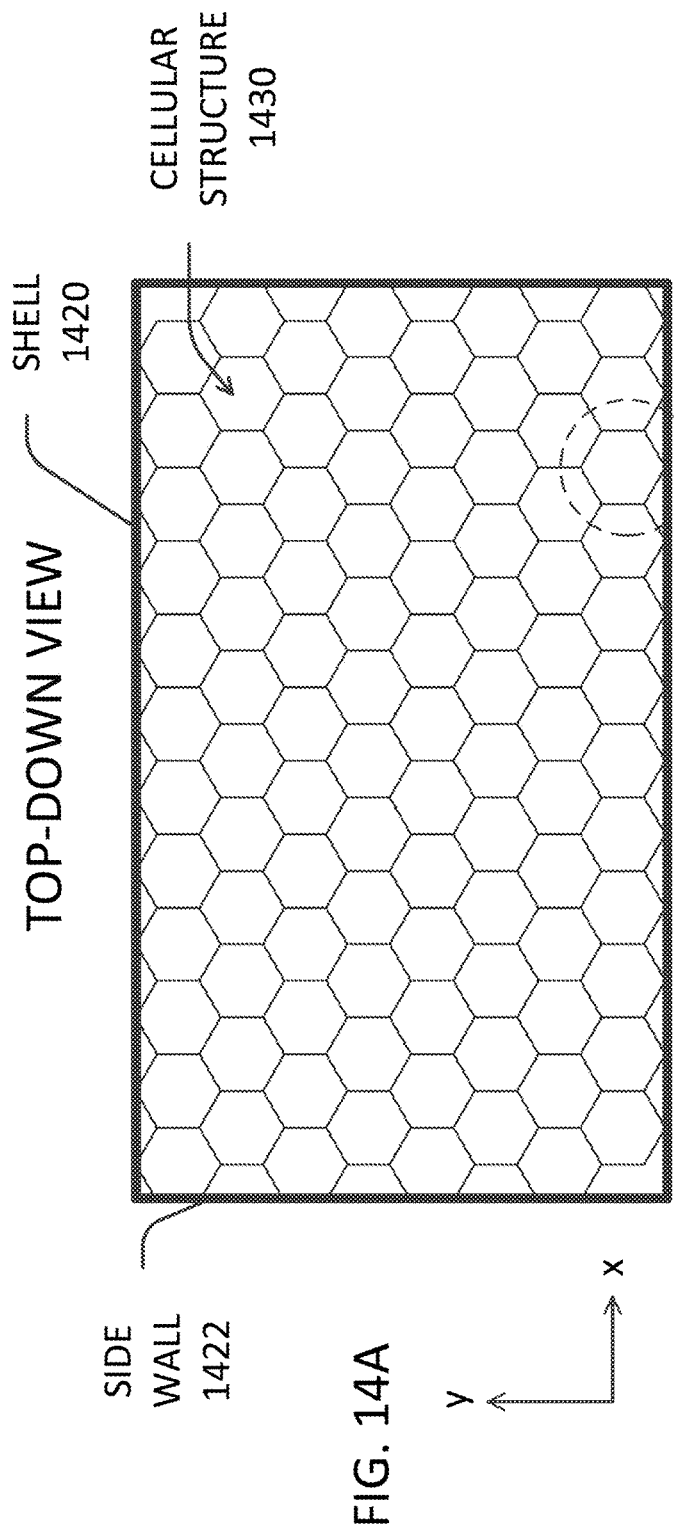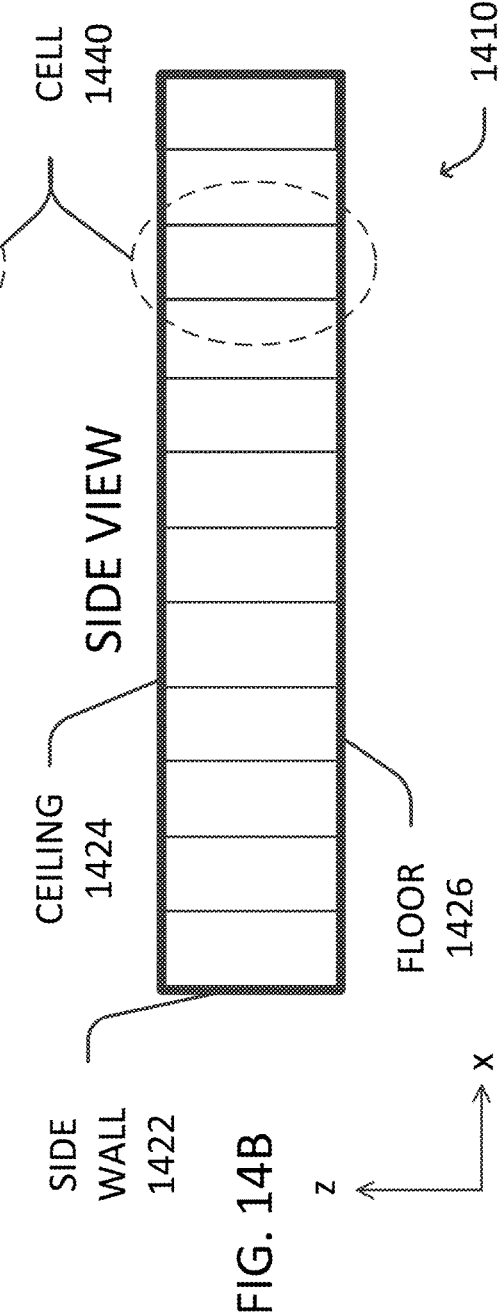
FIG. 14A
FIG. 14B

DEBINDING OF 3D OBJECTS

RELATED APPLICATION

This application is a continuation of U.S. Nonprovisional application Ser. No. 16/221,190, filed on Dec. 14, 2018, which claims the benefit of U.S. Provisional Application No. 62/599,582, filed on Dec. 15, 2017. The entire teachings of the above application applications are incorporated herein by reference in their entireties.

BACKGROUND

Metal injection molding (MIM) is a metalworking process useful in creating a variety of metal objects. A mixture of powdered metal and binder (e.g., a polymer such as polypropylene) forms a "feedstock" capable of being molded, at a high temperature, into the shape of a desired object or part. The initial molded part, also referred to as a "green part," then undergoes a debinding process to remove the binder, followed by a sintering process. During sintering, the part is brought to a temperature near the melting point of the powdered metal, which evaporates any remaining binder and forms the metal powder into a solid mass, thereby producing the desired metal object.

Additive manufacturing, also referred to as 3D printing, includes a variety of techniques for manufacturing a three-dimensional object via an automated process of forming successive layers of the object. 3D printers may utilize a feedstock comparable to that used in MIM, thereby creating a green part without the need for a mold. The green part may then undergo comparable debinding and sintering processes to produce the finished object.

SUMMARY

Example embodiments provide for removal of binding agents from 3D-printed parts. A 3D-printed part, including a build material and a binding agent, may be provided. The time of exposure of the 3D-printed part to the solvent may be determined by a) computing an effective thickness of the 3D-printed part, and b) scaling the time of exposure according to the effective thickness raised to a power having an exponent greater than 1. The 3D-printed part may then be immersed in a solvent bath that removes at least some of the binding agent from the 3D-printed part. The 3D-printed part may be removed from the solvent bath after the time of exposure.

The effective thickness may correspond to a distance from a deepest point to a nearest surface of the 3D-printed part, where the deepest point is a point interior to the 3D-printed part that is a maximum distance from any surface of the 3D-printed part. The 3D-printed part may retain less than 10% of the binding agent upon removal from the solvent bath. The effective thickness may be computed by identifying a point interior to a representation of the 3D-printed part that is a maximum distance from any surface of the representation, wherein the effective thickness may be a linear function of the maximum distance.

The effective thickness may be determined by a) defining geometry of a sphere, the sphere having a volume that is entirely encompassed by an internal volume of a representation of the 3D-printed part; and b) determining the effective thickness based on a radius of the sphere. The sphere may be the largest sphere that can be entirely encompassed by the internal volume. The geometry of the sphere may be defined by a) producing a random sampling of points from the representation; b) calculating, for each of the points, a distance from the point to a closest surface; and c) determining the radius of the sphere as a maximum of the calculated distances. Alternatively, the geometry of the sphere may be defined by a) generating a uniform grid sampling of points at the representation; b) calculating, for each of the points, a distance from the point to a closest surface; and c) determining the radius of the sphere as a maximum of the calculated distances. The center of the sphere may coincide with a point interior to the 3D-printed part that is a maximum distance from any surface of the 3D-printed part.

The effective thickness may be computed by a) defining geometry of a succession of reduced parts based on a representation of the 3D-printed part, where each of the reduced parts 1) occupies an internal volume of the representation of the 3D-printed part and 2) has a geometry corresponding to a displacement of a surface inward along its local normal vector relative to a geometry of a preceding reduced part; b) identifying a minimum distance from a surface of the part to a last one of the succession of reduced parts; and c) determining the effective thickness based on the minimum distance.

The exponent may be a value within a range, such as the range of 1.6-2.4. The build material may include a powdered metal, and the binding agent may include a polymer, wherein the solvent bath causes chemical dissolution of the polymer during the immersion.

Further embodiments include a method of removing binding agents from 3D-printed parts having a shell encompassing an interior honeycomb structure comprising a plurality of cells. A 3D-printed part, including a build material and a binding agent, may be provided. A time of exposure of the 3D-printed part to the solvent may be determined by a) computing a length of a longest cell along an axis of symmetry of the honeycomb structure, and b) scaling the time of exposure according to the length of the longest cell raised to a power. The 3D-printed part may then be immersed in a solvent bath that removes at least some of the binding agent from the 3D-printed part. The 3D-printed part may be removed from the solvent bath after the time of exposure.

The power may have an exponent of 1. A pore of each honeycomb cell may be in geometric contact with the shell. The time of exposure may be further scaled proportionally to the shell thickness and/or the area fraction of solid material in the plane of symmetry of the honeycomb. A void space of each of the plurality of cells may be connected to the shell.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 14A-B illustrate a part in a further embodiment,

DETAILED DESCRIPTION

Figure 1:
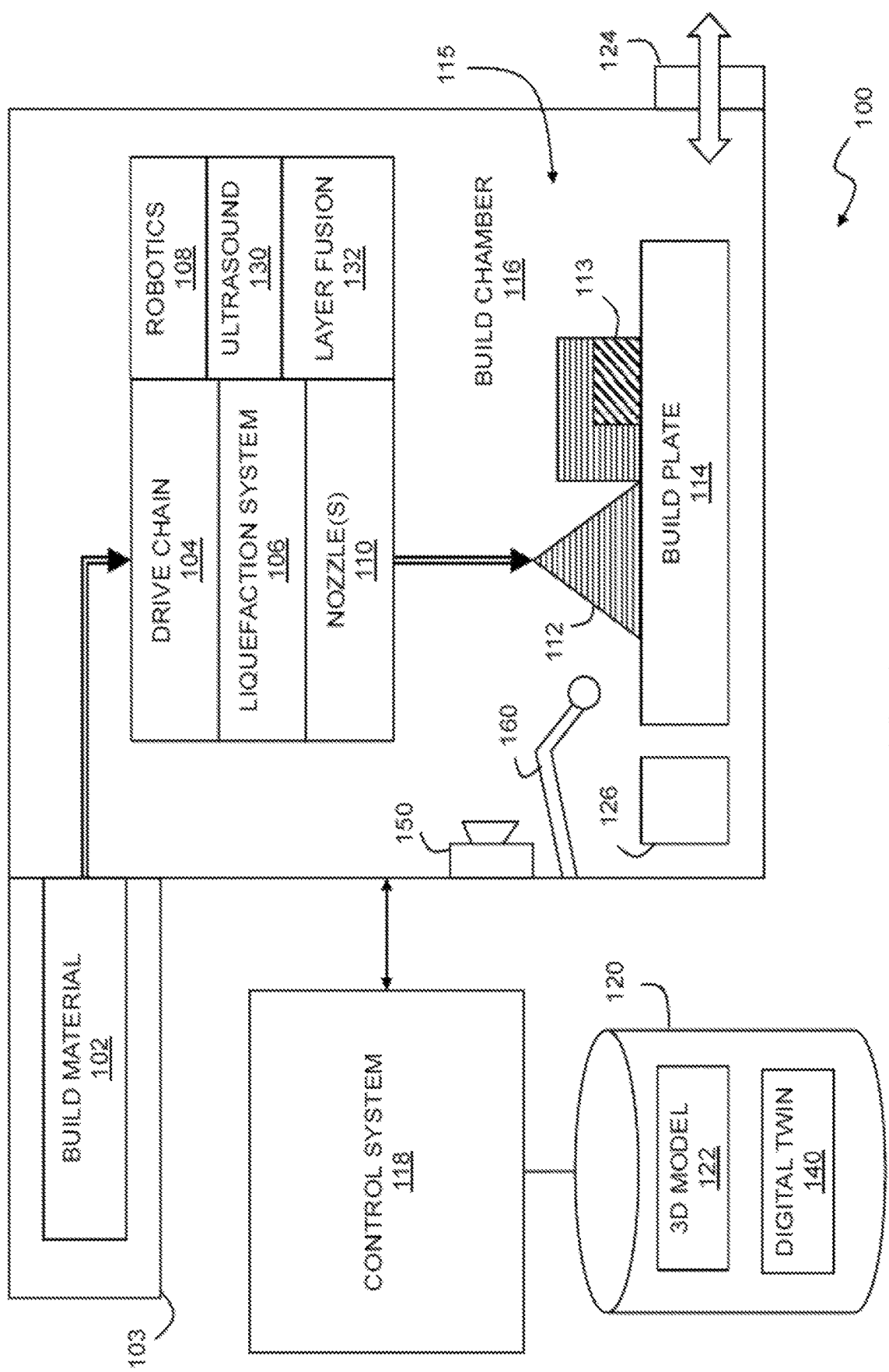
FIG. 1 is a block diagram of an additive manufacturing system.

A description of example embodiments follows.

In metal-injection molding (MIM) manufacturing, molded objects may be debound in a process comparable to the debinding process described above. However, in contrast to additive manufacturing, MIM-manufactured objects tend to be small, and are left to debind in the solvent for extended periods of time to guarantee that all of the primary binder is removed. Regardless of this extended debind time, debinding in MIM manufacturing does not typically require an excessive amount of time. Typical debinding times for parts produced in MIM processes are between 2 and 10 hours, with typical wall thicknesses from several hundred microns to several millimeters. The cost of waiting an extra hour or an extra 10-20% longer than needed is not highly costly for such debinding times. Further, in MIM processing, one can run an engineering study for each part, and thus determine the debinding time for that part by interrupting the debinding process. Because debind time is dependent on part geometry, performing an engineering study to determine and optimize the debind time of a part is cost-effective when many parts (e.g., 10,000) are going to be produced of identical geometry.

In contrast, 3D printing of objects using a MIM-like feedstock allows production of articles that are much larger in size, to a point where debinding may become an incredibly slow step, and thus rate-limiting to the process. Thicknesses for 3D-printed articles may be an order of magnitude larger than those for MIM-produced parts, with part cross sections sometimes measuring tens of millimeters. As the debind time scales non-linearly with the part thickness, debind times of 100 hours can be common for the largest parts. Allowing the part to debind for longer than needed would only add time to this already slow step, and a 20% margin of safety could add an entire day to the manufacturing process.

Further, a key advantage of a 3D printing process is that each part produced may be unique. Thus, it may not be possible nor cost-effective to run an engineering study to determine the debinding time of the part through interrupted measurements in the process.

Example embodiment enable the time to debind a part to be determined without a costly or time-consuming engineering study. In particular, the time to debind a part can be determined based on the geometry of the part, which can be derived from CAD drawings, print instructions such as toolpaths, or other information defining the part. From this geometry, example embodiments can predict the time required for a binding agent of a part to be substantially or fully removed from the part through chemical dissolution when the part is immersed in a solvent. As a result, the debind process can be terminated immediately or shortly after the part is debound, thereby minimizing the occupation time of the debinder and improving the speed of the additive manufacturing process. Further, the debind completion time can be predicted, and an indication of the completion time, as well as the current progress of the debind, can be reported to the user. Although embodiments below describe chemical debinding, in further embodiments, the time to debind a part via thermal debinding may be determined alternatively or in addition to a chemical debinding.

Example embodiments providing for debinding a part are described in further detail below with reference to FIGS. 9-16. First, a description of an additive manufacturing process, including printing, debinding and sintering, is provided below.

FIG. 1 is a block diagram of an additive manufacturing system for use with composites. The additive manufacturing system may include a three-dimensional printer 100 (or simply printer 100) that deposits metal using fused filament fabrication. Fused filament fabrication is well known in the art, and may be usefully employed for additive manufacturing with suitable adaptations to accommodate the forces, temperatures and other environmental requirements typical of the metallic injection molding materials described herein. In general, the printer 100 may include a build material 102 that is propelled by a drive train 104 and heated to a workable state by a liquefaction system 106, and then dispensed through one or more nozzles 110. By concurrently controlling robotic system 108 to position the nozzle(s) along an extrusion path, an object 112 (also referred to as a part) may be fabricated on a build plate 114 within a build chamber 116. In general, a control system 118 manages operation of the printer 100 to fabricate the object 112 according to a three-dimensional model using a fused filament fabrication process or the like.

A variety of commercially available compositions have been engineered for metal injection molding ("MIM"). These highly engineered materials can also be adapted for use as a build material 102 in printing techniques such as fused filament fabrication. For example, MIM feedstock materials, when suitably shaped, may be usefully extruded through nozzles typical of commercially available FFF machines, and are generally flowable or extrudable within typical operating temperatures (e.g., 160-250 degrees Celsius) of such machines. This temperature range may depend on the binder—e.g., some binders achieve appropriate viscosities at about 205 degrees Celsius, while others achieve appropriate viscosities at lower temperatures such as about 160-180 C degrees Celsius. One of ordinary skill will recognize that these ranges (and all ranges listed herein) are provided by way of example and not of limitation. Further, while there are no formal limits on the dimensions for powder metallurgy materials, parts with dimensions of around 100 millimeters on each side have been demonstrated to perform well for FFF fabrication of net shape green bodies. Any smaller dimensions may be usefully employed, and larger dimensions may also be employed provided they are consistent with processing dimensions such as the print resolution and the extrusion orifice diameter. For example, implementations target about a 0.300 μm diameter extrusion, and the MIM metal powder may typically be about 1~22 µm diameter, although nano sized powders can be used. The term metal injection molding material, as used herein, may include any such engineered materials, as well as other fine powder bases such as ceramics in a similar binder suitable for injection molding. Thus, where the term metal injection molding or the commonly used abbreviation, MIM, is used, the term may include injection molding materials using powders other than, or in addition to, metals and, thus, may include ceramics. Also, any reference to "MIM materials," "powder metallurgy materials," "MIM feedstocks," or the like may generally refer to metal powder and/or ceramic powder mixed with one or more binding materials, e.g., a backbone binder that holds everything together and a bulk binder that carries the metal and backbone into position within a mold or print. Other material systems may be suitable for fabricating metal parts using fabrication techniques such as stereolithography or binder jetting, some of which are discussed in greater detail below. Such fabrication techniques may, in some applications, be identical to techniques for fabricating parts from ceramic material.

In general, fabrication of such materials may proceed as with a conventional FFF process, except that after the net shape is created, the green part may be optionally machined or finished while in a more easily workable state, and then debound and sintered into a final, dense object using any of the methods common in the art for MIM materials. The final object, as described above, may include a metal, a metal alloy, a ceramic, or another suitable combination of materials.

The build material 102 may be fed from a carrier 103 configured to dispense the build material to the three-dimensional printer either in a continuous (e.g., wire) or discrete (e.g., billet) form. The build material 102 may for example be supplied in discrete units one by one as billets or the like into an intermediate chamber for delivery into the build chamber 118 and subsequent melt and deposition. The carrier 103 may include a spool or cartridge containing the build material 102 in a wire form. Where a vacuum or other controlled environment is desired, the wire may be fed through a vacuum gasket into the build chamber 118 in a continuous fashion, however, typical MIM materials can be heated to a workable plastic state under normal atmospheric conditions, except perhaps for filtering or the like to remove particles from the build chamber 116. Thus, a MIM build material may be formed into a wire, the build material including an engineered composite of metal powder and a polymeric binder or the like, wherein the carrier 103 is configured to dispense the build material in a continuous feed to a three-dimensional printer. For environmentally sensitive materials, the carrier 103 may provide a vacuum environment for the build material 102 that can be directly or indirectly coupled to the vacuum environment of the build chamber 118. More generally, the build chamber 118 (and the carrier 103) may maintain any suitably inert environment for handling of the build material 102, such as a vacuum, and oxygen-depleted environment, an inert gas environment, or some gas or combination of gasses that are not reactive with the build material 102 where such conditions are necessary or beneficial during three-dimensional fabrication.

A drive train 104 may include any suitable gears, compression pistons, or the like for continuous or indexed feeding of the build material 116 into the liquefaction system 106. The drive train 104 may include gear shaped to mesh with corresponding features in the build material such as ridges, notches, or other positive or negative detents. The drive train 104 may use heated gears or screw mechanisms to deform and engage with the build material. Thus, a printer for a fused filament fabrication process can heats a build material to a working temperature, and that heats a gear that engages with, deforms, and drives the composite in a feed path. A screw feed may also or instead be used.

For more brittle MIM materials, a fine-toothed drive gear of a material such as a hard resin or plastic may be used to grip the material without excessive cutting or stress concentrations that might otherwise crack, strip, or otherwise compromise the build material.

The drive train 104 may use bellows, or any other collapsible or telescoping press to drive rods, billets, or similar units of build material into the liquefaction system 106. Similarly, a piezoelectric or linear stepper drive may be used to advance a unit of build media in a non-continuous, stepped method with discrete, high-powered mechanical increments. Further, the drive train 104 may include multiple stages. In a first stage, the drive train 104 may heat the composite material and form threads or other features that can supply positive gripping traction into the material. In the next stage, a gear or the like matching these features can be used to advance the build material along the feed path. A collet feed may be used (e.g., similar to those on a mechanical pencil). A soft wheel or belt drive may also or instead be used. A shape forming wheel drive may be used to ensure accuracy of size and thus the build. More generally, the drive train 104 may include any mechanism or combination of mechanisms used to advance build material 102 for deposition in a three-dimensional fabrication process.

The liquefaction system 106 may be any liquefaction system configured to heat the composite to a working temperature in a range suitable for extrusion in a fused filament fabrication process. Any number of heating techniques may be used. Electrical techniques such as inductive or resistive heating may be usefully applied to liquefy the build material 102. This may, for example include inductively or resistively heating a chamber around the build material 102 to a temperature at or near the glass transition temperature of the build material 102, or some other temperature where the binder or other matrix becomes workable, extrudable, or flowable for deposition as described herein. Where the contemplated build materials are sufficiently conductive, they may be directly heated through contact methods (e.g., resistive heating with applied current) or non-contact methods (e.g., induction heating using an external electromagnet to drive eddy currents within the material). The choice of additives may further be advantageously selected to provide bulk electrical characteristics (e.g., conductance/resistivity) to improve heating. When directly heating the build material 102, it may be useful to model the shape and size of the build material 102 in order to better control electrically-induced heating. This may include estimates or actual measurements of shape, size, mass, etc.

In the above context, "liquefaction" does not require complete liquefaction. That is, the media to be used in printing may be in a multi-phase state, and/or form a paste or the like having highly viscous and/or non-Newtonian fluid properties. Thus the liquefaction system 106 may include, more generally, any system that places a build material 102 in condition for use in fabrication.

In order to facilitate resistive heating of the build material 102, one or more contact pads, probes or the like may be positioned within the feed path for the material in order to provide locations for forming a circuit through the material at the appropriate location(s). In order to facilitate induction heating, one or more electromagnets may be positioned at suitable locations adjacent to the feed path and operated, e.g., by the control system 118, to heat the build material internally through the creation of eddy currents. Both of these techniques may be used concurrently to achieve a more tightly controlled or more evenly distributed electrical heating within the build material. The printer 100 may also be instrumented to monitor the resulting heating in a variety of ways. For example, the printer 100 may monitor power delivered to the inductive or resistive circuits. The printer 100 may also or instead measure temperature of the build material 102 or surrounding environment at any number of locations. The temperature of the build material 102 may be inferred by measuring, e.g., the amount of force required to drive the build material 102 through a nozzle 110 or other portion of the feed path, which may be used as a proxy for the viscosity of the build material 102. More generally, any techniques suitable for measuring temperature or viscosity of the build material 102 and responsively controlling applied electrical energy may be used to control liquefaction for a fabrication process using composites as described herein.

The liquefaction system 106 may also or instead include any other heating systems suitable for applying heat to the build material 102 to a suitable temperature for extrusion. This may, for example include techniques for locally or globally augmenting heating using, e.g., chemical heating, combustion, ultrasound heating, laser heating, electron beam heating or other optical or mechanical heating techniques and so forth.

The liquefaction system 106 may include a shearing engine. The shearing engine may create shear within the composite as it is heated in order to maintain a mixture of the metallic base and a binder or other matrix, or to maintain a mixture of various materials in a paste or other build material. A variety of techniques may be employed by the shearing engine. The bulk media may be axially rotated as it is fed along the feed path into the liquefaction system 106. Further, one or more ultrasonic transducers may be used to introduce shear within the heated material. Similarly, a screw, post, arm, or other physical element may be placed within the heated media and rotated or otherwise actuated to mix the heated material. Bulk build material may include individual pellets, rods, or coils (e.g., of consistent size) and fed into a screw, a plunger, a rod extruder, or the like. For example, a coiled build material can be uncoiled with a heater system including a heated box, heated tube, or heater from the printer head. Also, a direct feed with no heat that feeds right into the print head is also possible.

The robotic system 108 may include a robotic system configured to three-dimensionally position the nozzle 110 within the working volume 115 of the build chamber 116. This may, for example, include any robotic components or systems suitable for positioning the nozzle 110 relative to the build plate 114 while depositing the composite in a pattern to fabricate the object 112. A variety of robotics systems are known in the art and suitable for use as the robotic system 108 described herein. For example, the robotics may include a Cartesian or xy-z robotics system employing a number of linear controls to move independently in the x-axis, the y-axis, and the z-axis within the build chamber 116. Delta robots may also or instead be usefully employed, which can, if properly configured, provide significant advantages in terms of speed and stiffness, as well as offering the design convenience of fixed motors or drive elements. Other configurations such as double or triple delta robots can increase range of motion using multiple linkages. More generally, any robotics suitable for controlled positioning of the nozzle 110 relative to the build plate 114, especially within a vacuum or similar environment, may be usefully employed including any mechanism or combination of mechanisms suitable for actuation, manipulation, locomotion and the like within the build chamber 116.

The nozzle(s) 110 may include one or more nozzles for dispensing the build material 102 that has been propelled with the drive train 104 and heated with the liquefaction system 106 to a suitable working temperature. In a multi-phase extrusion this may include a working temperature above the melting temperature of the metallic base of the composite, or more specifically between a first temperature at which the metallic base melts and the second temperature (above the first temperature) at which a second phase of the composite remains inert.

The nozzles 110 may, for example, be used to dispense different types of material so that, for example, one nozzle 110 dispenses a composite build material while another nozzle 110 dispenses a support material in order to support bridges, overhangs, and other structural features of the object 112 that would otherwise violate design rules for fabrication with the composite build material. Further, one of the nozzles 110 may deposit a different type of material, such as a thermally compatible polymer or a metal or polymer loaded with fibers of one or more materials to increase tensile strength or otherwise improve mechanical properties of the resulting object 112. Two types of supports may be used—(1) build supports and (2) sinter supports—e.g., using different materials printed into the same part to achieve these supports, or to create a distinguishing junction between these supports and the part.

The nozzle 110 may preferably be formed of a material or combination of materials with suitable mechanical and thermal properties. For example, the nozzle 110 will preferably not degrade at the temperatures wherein the composite material is to be dispensed, or due to the passage of metallic particles through a dispensing orifice therein. While nozzles for traditional polymer-based fused filament fabrication may be made from brass or aluminum alloys, a nozzle that dispenses metal particles may be formed of harder materials, or materials compatible with more elevated working temperatures such as a high carbon steel that is hardened and tempered. Other materials such as a refractory metal (e.g. molybdenum, tungsten) or refractory ceramic (e.g. mullite, corundum, magnesia) may also or instead be employed. In some instances, aluminum nozzles may instead be used for MIM extrusion of certain MIM materials. Further, a softer thermally conductive material with a hard, wear-resistant coating may be used, such as copper with a hard nickel plating.

The nozzle 110 may include one or more ultrasound transducers 130 as described herein. Ultrasound may be usefully applied for a variety of purposes in this context. The ultrasound energy may facilitate extrusion by mitigating clogging by reducing adhesion of a build material to an interior surface of the nozzle 110. A variety of energy director techniques may be used to improve this general approach. For example, a deposited layer may include one or more ridges, which may be imposed by an exit shape of the nozzle 110, to present a focused area to receive ultrasound energy introduced into the interface between the deposited layer and an adjacent layer.

The nozzle 110 may include an induction heating element, resistive heating element, or similar components to directly control the temperature of the nozzle 110. This may be used to augment a more general liquefaction process along the feed path through the printer 100, e.g., to maintain a temperature of the build material 102 during fabrication, or this may be used for more specific functions, such as declogging a print head by heating the build material 102 substantially above the working range, e.g., to a temperature where the composite is liquid. While it may be difficult or impossible to control deposition in this liquid state, the heating can provide a convenient technique to reset the nozzle 110 without more severe physical intervention such as removing vacuum to disassemble, clean, and replace the affected components.

The nozzle 110 may include an inlet gas or fan, e.g., an inert gas, to cool media at the moment it exits the nozzle 110. The resulting gas jet may, for example, immediately stiffen the dispensed material to facilitate extended bridging, larger overhangs, or other structures that might otherwise require support structures underneath.

The object 112 may be any object suitable for fabrication using the techniques described herein. This may include functional objects such as machine parts, aesthetic objects such as sculptures, or any other type of objects, as well as combinations of objects that can be fit within the physical constraints of the build chamber 116 and build plate 114. Some structures such as large bridges and overhangs cannot be fabricated directly using fused filament fabrication or the like because there is no underlying physical surface onto which a material can be deposited. In these instances, a support structure 113 may be fabricated, preferably of a soluble or otherwise readily removable material, in order to support the corresponding feature.

Where multiple nozzles 110 are provided, a second nozzle may usefully provide any of a variety of additional build materials. This may, for example, include other composites, alloys, bulk metallic glass's, thermally matched polymers and so forth to support fabrication of suitable support structures. One of the nozzles 110 may dispense a bulk metallic glass that is deposited at one temperature to fabricate a support structure 113, and a second, higher temperature at an interface to a printed object 112 where the bulk metallic glass can be crystallized at the interface to become more brittle and facilitate mechanical removal of the support structure 113 from the object 112. Conveniently, the bulk form of the support structure 113 can be left in the supercooled state so that it can retain its bulk structure and be removed in a single piece. Thus, a printer may fabricate a portion of a support structure 113 with a bulk metallic glass in a super-cooled liquid region, and may fabricate a layer of the support structure adjacent to a printed object at a greater temperature in order to crystalize the build material 102 into a non-amorphous alloy. The bulk metallic glass particles may thus be loaded into a MIM feedstock binder system and may provide a support. Pure binding or polymer materials (e.g., without any loading) may also or instead provide a support. A similar metal MIM feedstock may be used for multi-material part creation. Ceramic or dissimilar metal MIM feedstock may be used for a support interface material.

The build plate 114 within the working volume 115 of the build chamber 116 may include a rigid and substantially planar surface formed of any substance suitable for receiving deposited composite or other material(s)s from the nozzles 110. The build plate 114 may be heated, e.g., resistively or inductively, to control a temperature of the build chamber 116 or the surface upon which the object 112 is being fabricated. This may, for example, improve adhesion, prevent thermally induced deformation or failure, and facilitate relaxation of stresses within the fabricated object.

Further, the build plate 114 may be a deformable build plate that can bend or otherwise physical deform in order to detach from the rigid object 112 formed thereon.

The build chamber 116 may be any chamber suitable for containing the build plate 114, an object 112, and any other components of the printer 100 used within the build chamber 116 to fabricate the object 112. The build chamber 116 may be an environmentally sealed chamber that can be evacuated with a vacuum pump 124 or similar device in order to provide a vacuum environment for fabrication. This may be particularly useful where oxygen causes a passivation layer that might weaken layer-to-layer bonds in a fused filament fabrication process as described herein, or where particles in the atmosphere might otherwise interfere with the integrity of a fabricated object, or where the build chamber 116 is the same as the sintering chamber. Alternatively, only oxygen may be removed from the build chamber 116.

Similarly, one or more passive or active oxygen getters 126 or other similar oxygen absorbing material or system may usefully be employed within the build chamber 116 to take up free oxygen within the build chamber 116. The oxygen getter 126 may, for example, include a deposit of a reactive material coating an inside surface of the build chamber 116 or a separate object placed therein that completes and maintains the vacuum by combining with or adsorbing residual gas molecules. The oxygen getters 126, or more generally, gas getters, may be deposited as a support material using one of the nozzles 110, which facilitates replacement of the gas getter with each new fabrication run and can advantageously position the gas getter(s) near printed media in order to more locally remove passivating gasses where new material is being deposited onto the fabricated object. The oxygen getters 126 may include any of a variety of materials that preferentially react with oxygen including, e.g., materials based on titanium, aluminum, and so forth. Further, the oxygen getters 126 may include a chemical energy source such as a combustible gas, gas torch, catalytic heater, Bunsen burner, or other chemical and/or combustion source that reacts to extract oxygen from the environment. There are a variety of low-CO and NOx catalytic burners that may be suitably employed for this purpose without CO.

The oxygen getter 126 may be deposited as a separate material during a build process. Thus, a three-dimensional object may be fabricated from a metallic composite, including a physically adjacent structure (which may or may not directly contact the three-dimensional object) fabricated to contain an agent to remove passivating gasses around the three-dimensional object. Other techniques may be similarly employed to control reactivity of the environment within the build chamber 116, or within post-processing chambers or the like as described below. For example, the build chamber 116 may be filled with an inert gas or the like to prevent oxidation.

The control system 118 may include a processor and memory, as well as any other co-processors, signal processors, inputs and outputs, digital-to-analog or analog-to-digital converters and other processing circuitry useful for monitoring and controlling a fabrication process executing on the printer 100. The control system 118 may be coupled in a communicating relationship with a supply of the build material 102, the drive train 104, the liquefaction system 106, the nozzles 110, the build plate 114, the robotic system 108, and any other instrumentation or control components associated with the build process such as temperature sensors, pressure sensors, oxygen sensors, vacuum pumps, and so forth. The control system 118 may be operable to control the robotic system 108, the liquefaction system 106 and other components to fabricate an object 112 from the build material 102 in three dimensions within the working volume 115 of the build chamber 116.

The control system 118 may generate machine ready code for execution by the printer 100 to fabricate the object 112 from the three-dimensional model 122 stored to a database 120. The control system 118 may deploy a number of strategies to improve the resulting physical object structurally or aesthetically. For example, the control system 118 may use plowing, ironing, planing, or similar techniques where the nozzle 110 runs over existing layers of deposited material, e.g., to level the material, remove passivation layers, apply an energy director topography of peaks or ridges to improve layer-to-layer bonding, or otherwise prepare the current layer for a next layer of material. The nozzle 110 may include a low-friction or non-stick surface such as Teflon, TiN or the like to facilitate this plowing process, and the nozzle 110 may be heated and/or vibrated (e.g., using an ultrasound transducer) to improve the smoothing effect. This surface preparation may be incorporated into the initially-generated machine ready code. Alternatively, the printer 100 may dynamically monitor deposited layers and determine, on a layer-bylayer basis, whether additional surface preparation is necessary or helpful for successful completion of the object.

Figure 2:
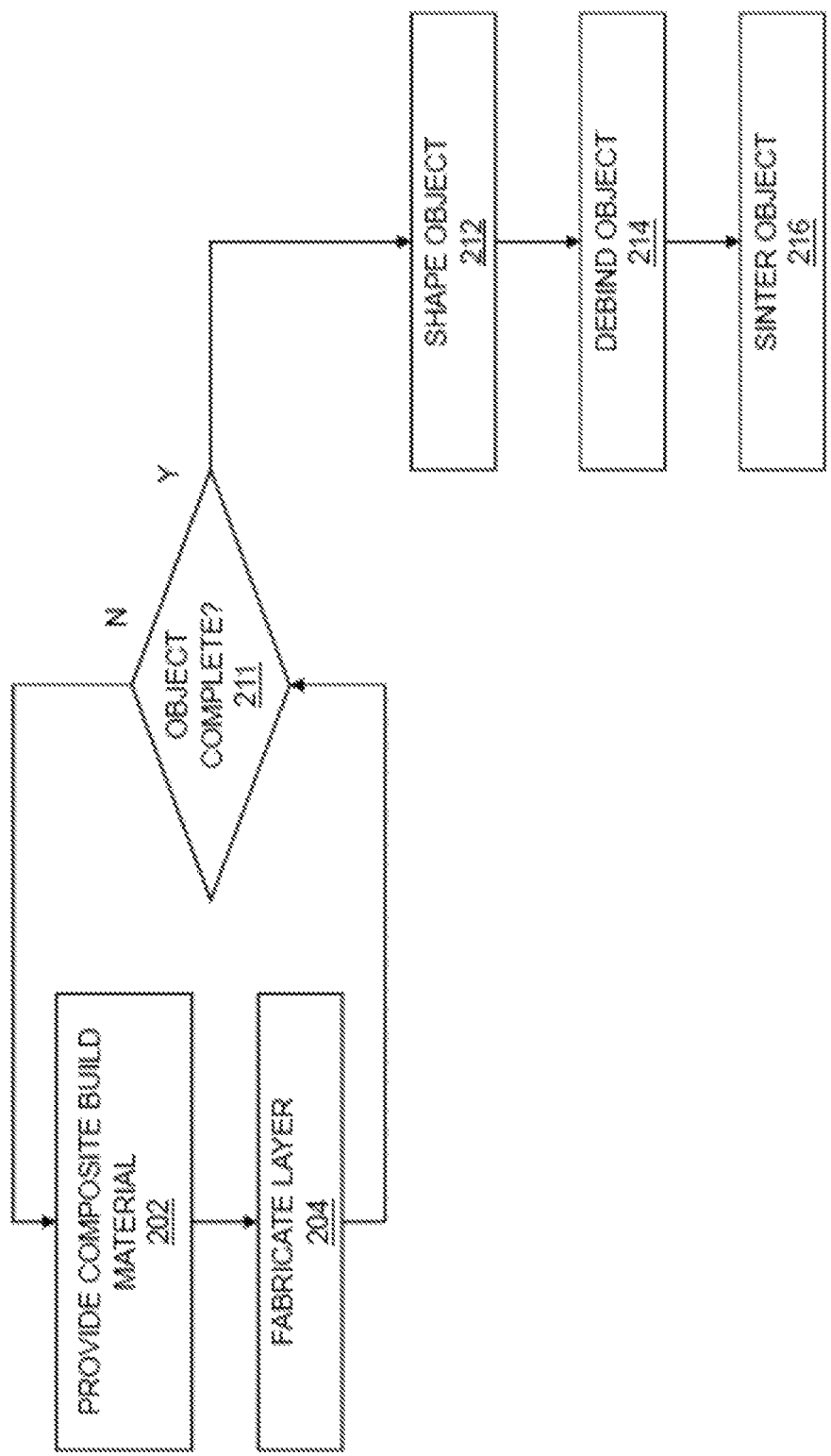
FIG. 2 is a flow chart of a method for printing with composites.

FIG. 2 shows a flow chart of a method for printing with composites, e.g., metal injection molding materials. As shown in step 202, the process 200 may include providing a build material including an injection molding material, or where a support interface is being fabricated, a MIM binder (e.g., a MIM binder with similar thermal characteristics). The material may include, for example, any of the MIM materials described herein. The material may be provided as a build material in a billet, a wire, or any other cast, drawn, extruded or otherwise shaped bulk form. As described above, the build material may be further packaged in a cartridge, spool, or other suitable carrier that can be attached to an additive manufacturing system for use.

As shown in step 204, the process may include fabricating a layer of an object. This may include any techniques that can be adapted for use with MIM materials. For example, this may include fused filament fabrication, jet printing or any other techniques for forming a net shape from a MIM material (and more specifically for techniques used for forming a net shape from a polymeric material loaded with a second phase powder).

As shown in step 211, this process may be continued and repeated as necessary to fabricate an object within the working volume. While the process may vary according to the underlying fabrication technology, an object can generally be fabricated layer by layer based on a three-dimensional model of the desired object. As shown in step 212, the process 200 may include shaping the net shape object after the additive process is complete. Before debinding or sintering, the green body form of the object is usefully in a soft, workable state where defects and printing artifacts can be easily removed, either manually or automatically. Thus the process 200 may take advantage of this workable, intermediate state to facilitate quality control or other process-related steps, such as removal of supports that are required for previous printing steps, but not for debinding or sintering.

As shown in step 214, the process 200 may include debinding the printed object. In general debinding may be performed chemically or thermally to remove a binder that retains a metal (or ceramic or other) powder in a net shape. Contemporary injection molding materials are often engineered for thermal debinding, which advantageously permits debinding and sintering to be performed in a single baking operation, or in two similar baking operations. In general, the debinding process functions to remove binder from the net shape green object, thus leaving a very dense structure of metal (or ceramic or other) particles that can be sintered into the final form.

As shown in step 216, the process 200 may include sintering the printed and debound object into a final form. In general, sintering may be any process of compacting and forming a solid mass of material by heating without liquefaction. During a sintering process, atoms can diffuse across particle boundaries to fuse into a solid piece. Because sintering can be performed at temperatures below the melting temperature, this advantageously permits fabrication with very high melting point materials such as tungsten and molybdenum.

Numerous sintering techniques are known in the art, and the selection of a particular technique may depend upon the build material used, and the desired structural, functional or aesthetic result for the fabricated object. For example, in solid-state (non-activated) sintering, metal powder particles are heated to form connections (or "necks") where they are in contact. Over time, these necks thicken and create a dense part, leaving small, interstitial voids that can be closed, e.g., by hot isostatic pressing (HIP) or similar processes. Other techniques may also or instead be employed. For example, solid state activated sintering uses a film between powder particles to improve mobility of atoms between particles and accelerate the formation and thickening of necks. As another example, liquid phase sintering may be used, in which a liquid forms around metal particles. This can improve diffusion and joining between particles, but also may leave lower-melting phase within the sintered object that impairs structural integrity. Other advanced techniques such as nano-phase separation sintering may be used, for example to form a high-diffusivity solid at the necks to improve the transport of metal atoms at the contact point Debinding and sintering may result in material loss and compaction, and the resulting object may be significantly smaller than the printed object. However, these effects are generally linear in the aggregate, and net shape objects can be usefully scaled up when printing to create a corresponding shape after debinding and sintering.

Figure 3:
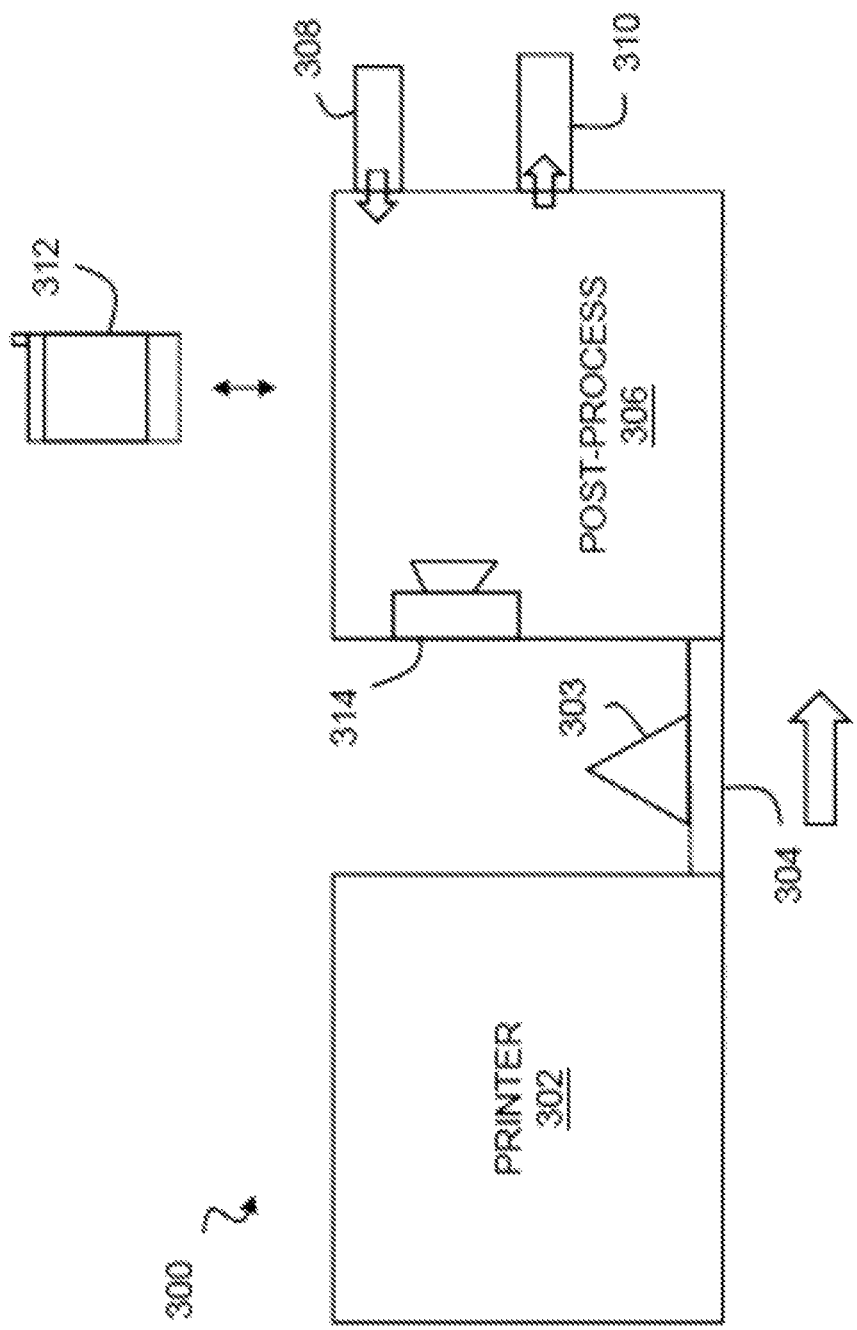
FIG. 3 illustrates an additive manufacturing system for use with metal injection molding materials.

FIG. 3 shows an additive manufacturing system for use with metal injection molding materials. The system 300 may include a printer 302, a conveyor 304, and a postprocessing station 306. In general, the printer 302 may be any of the printers described above including, for example a fused filament fabrication system, a stereolithography system, a selective laser sintering system, or any other system that can be usefully adapted to form a net shape object under computer control using injection molding build materials. The output of the printer 302 may be an object 303 that is a green body including any suitable powder (e.g., metal, metal alloy, ceramic, and so forth, as well as combinations of the foregoing), along with a binder that retains the powder in a net shape produced by the printer 302.

The conveyor 304 may be used to transport the object 303 from the printer 302 to a post-processing station 306 where debinding and sintering can be performed. The conveyor 304 may be any suitable device or combination of devices suitable for physically transporting the object 303. This may, for example, include robotics and a machine vision system or the like on the printer side for detaching the object 303 from a build platform or the like, as well as robotics and a machine vision system or the like on the post-processing side to accurately place the object 303 within the post-processing station 306. Further, the post-processing station 306 may serve multiple printers so that a number of objects can be debound and sintered concurrently, and the conveyor 304 may interconnect the printers and post-processing station so that multiple print jobs can be coordinated and automatically completed in parallel. Alternatively, the object 303 may be manually transported between the two corresponding stations.

The post-processing station 306 may be any system or combination of systems useful for converting a green part formed into a desired net shape from a metal injection molding build material by the printer 302 into a final object. The post-processing station 306 may, for example, include a chemical debinding station and a thermal sintering station that can be used in sequence to produce a final object. Some contemporary injection molding materials are engineered for thermal debinding, which makes it possible to perform a combination of debinding and sintering steps with a single oven or similar device. While the thermal specifications of a sintering furnace may depend upon the powder to be sintered, the binder system, the loading, and other properties of the green object and the materials used to manufacture same, commercial sintering furnaces for thermally debound and sintered MIM parts may typically operate with an accuracy of +/−5 degrees Celsius or better, and temperatures of at least 600 degrees C., or from about 200 degrees C. to about 1900 degrees C. for extended times. Any such furnace or similar heating device may be usefully employed as the post-processing station 306 as described herein. Vacuum or pressure treatment may also or instead be used. Identical or similar material beads with a non-binding coating may be used for a furnace support—e.g., packing in a bed of this material that shrinks similar to the part, except that it will not bond to the part.

Embodiments may be implemented with a wide range of other debinding and sintering processes. For example, the binder may be removed in a chemical debind, thermal debind, or some combination of these. Other debinding processes are also known in the art (such as supercritical or catalytic debinding), any of which may also or instead be employed by the post-processing station 306 as described herein. For example, in a common process, a green part is first debound using a chemical debind, which is following by a thermal debind at a moderately high temperature (in this context, around 700-800 C) to remove organic binder and create enough necks among a powdered material to permit handling. From this stage, the object may be moved to a sintering furnace to remove any remaining components of a binder system densify the object. Alternatively, a pure thermal debind may be used to remove the organic binder. More general, any technique or combination of techniques may be usefully employed to debind an object as described herein.

Similarly, a wide range of sintering techniques may be usefully employed by the post-processing station. For example, an object may be consolidated in a furnace to a high theoretical density using vacuum sintering. Alternatviely, the furnace may use a combination of flowing gas (e.g., at below atmosphere, slightly above atmosphere, or some other suitable pressure) and vacuum sintering. More generally, any sintering or other process suitable for improving object density may be used, preferably where the process yields a near-theoretical density part with little or no porosity. Hot-isostatic pressing ("HIP") may also (e.g., as a postsinter finishing step) or instead be employed, e.g., by applying elevated temperatures and pressures of 10-50 ksi, or between about 15 and 30 ksi. Alternatively, the object may be processed using any of the foregoing, followed by a moderate overpressure (greater than the sintering pressure, but lower than HIP pressures). In this latter process, gas may be pressurized at 100-1500 psi and maintained at elevated temperatures within the furnace or some other supplemental chamber. Alternatively, the object may be separately heated in one furnace, and then immersed in a hot granular media inside a die, with pressure applied to the media so that it can be transmitted to the object to drive more rapid consolidation to near full density. More generally, any technique or combination of techniques suitable for removing binder systems and driving a powdered material toward consolidation and densification may be used by the post-processing station 306 to process a fabricated green part as described herein.

The post-processing station 306 may be incorporated into the printer 302, thus removing a need for a conveyor 304 to physically transport the object 303. The build volume of the printer 302 and components therein may be fabricated to withstand the elevated debinding/sintering temperatures. Alternatively, the printer 302 may provide movable walls, barriers, or other enclosure(s) within the build volume so that the debind/sinter can be performed while the object 303 is on a build platform within the printer 302, but thermally isolated from any thermally sensitive components or materials.

The post-processing station 306 may be optimized in a variety of ways for use in an office environment. The post-processing station 306 may include an inert gas source 308. The inert gas source 308 may, for example, include argon or other inert gas (or other gas that is inert to the sintered material), and may be housed in a removable and replaceable cartridge that can be coupled to the post-processing station 306 for discharge into the interior of the post-processing station 306, and then removed and replaced when the contents are exhausted. The post-processing station 306 may also or instead include a filter 310 such as a charcoal filter or the like for exhausting gasses that can be outgassed into an office environment in an unfiltered form. For other gasses, an exterior exhaust, or a gas container or the like may be provided to permit use in unventilated areas. For reclaimable materials, a closed system may also or instead be used, particularly where the environmental materials are expensive or dangerous.

The post-processing station 306 may be coupled to other system components. For example, the post-processing station 306 may include information from the printer 302, or from a controller for the printer, about the geometry, size, mass and other physical characteristics of the object 303 in order to generate a suitable debinding and sintering profile. Optionally, the profile may be created independently by the controller or other resource and transmitted to the post-processing station 306 when the object 303 is conveyed. Further, the post-processing station 306 may monitor the debinding and sintering process and provide feedback, e.g., to a smart phone or other remote device 312, about a status of the object, a time to completion, and other processing metrics and information. The post-processing station 306 may include a camera 314 or other monitoring device to provide feedback to the remote device 312, and may provide time lapse animation or the like to graphically show sintering on a compressed time scale. Post-processing may also or instead include finishing with heat, a hot knife, tools, or similar, and may include applying a finish coat.

Figure 4:
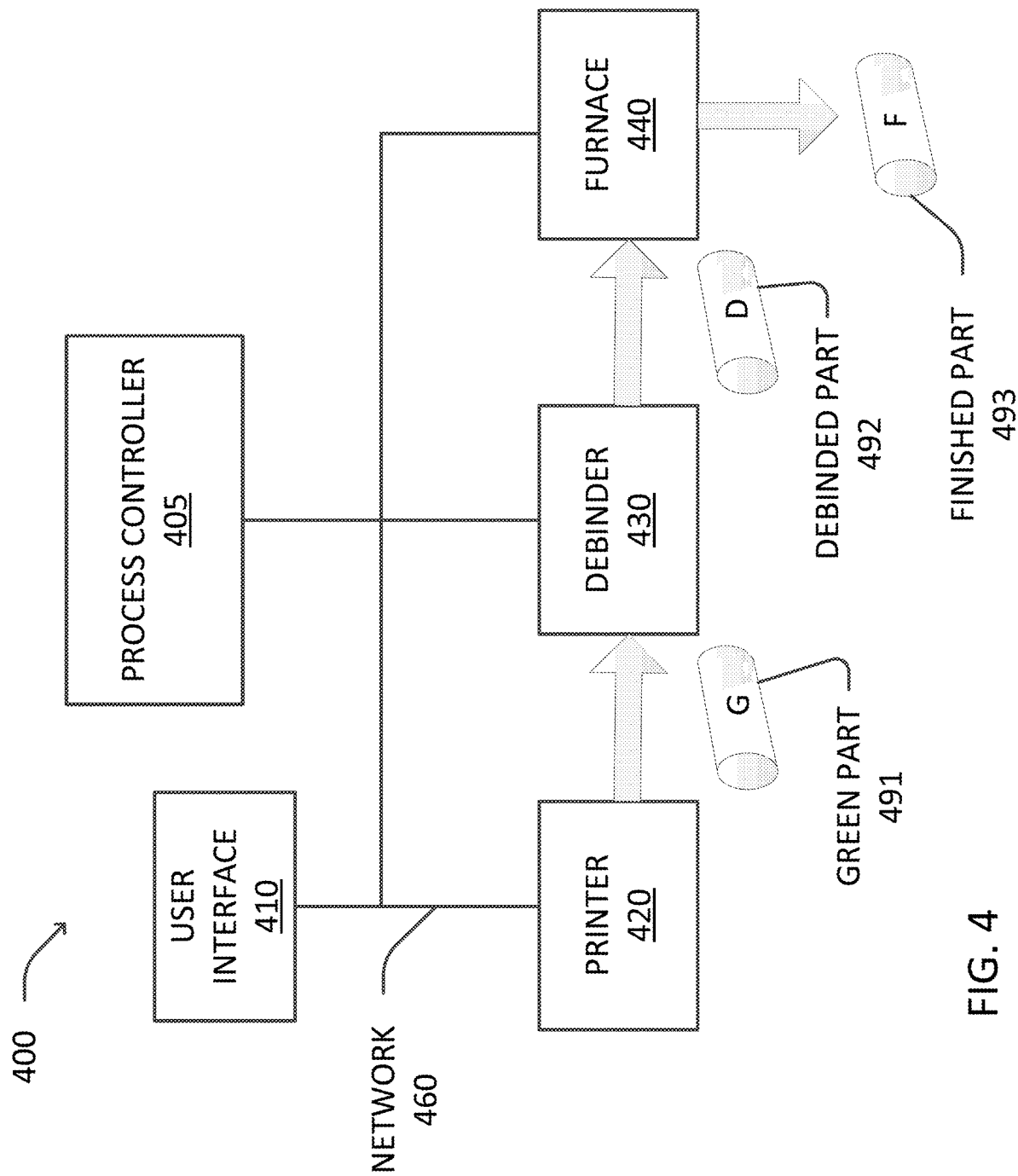
FIG. 4 is a block diagram of an additive manufacturing system.

FIG. 4 is a block diagram of an additive manufacturing system 400. The system 400 may include a printer 420, a debinder 430, and a furnace 440 operating in series to manufacture a finished part 460. In particular, the printer may produce a fabricated green part 491, the debinder 430 debinds the green part 491 to produce a brown part 492, and the furnace 440 sinters the brown part 492 to produce the finished part 491. The devices 420, 430, 440 may be communicatively coupled to a process controller 405 and user interface 410 via a network 460 (e.g., a wired, wireless and/or cloud network). The process controller 405 may be implemented as a network server, workstation or off-site cloud service, and may communicate with, and control operations at, one or more of the printer 420, debinder 430 and furnace 440. The process controller 405 may also include a distributed processing architecture, where processing elements at the printer 420, debinder 430 and/or furnace 440 perform portions of the control operations. The user interface 410 may comprise one or a plurality of devices connected to the network 460, such as a laptop, workstation, mobile device (e.g., smartphone, tablet), and/or or touchscreens integrated into the printer 420, debinder 430 and/or furnace 440.

Via the user interface 410, a user may communicate with the process controller 405 to indicate one or more parts to be manufactured. In response, the process controller 405 can manage the entire manufacturing process, controlling the printer 420, debinder 430 and furnace 440 to manufacture to produce the green part 491, brown part 492 and finished part 493, respectively, and instructing the user via the user interface 410 as necessary to manipulate the parts during the process.

The system 400 may incorporate one or more features of the printer 100 and system 300 described above with reference to FIGS. 1-3. For example, the printer 420 may incorporate features of the printers 100, 300 and the process controller 405 may include features of the control system 118 and database 120. Further, the debinder 430 and furnace 440 may incorporate features of the post-processing station 306, and the system 400 may carry out the manufacturing process 200 to fabricate a part.

Figure 5:
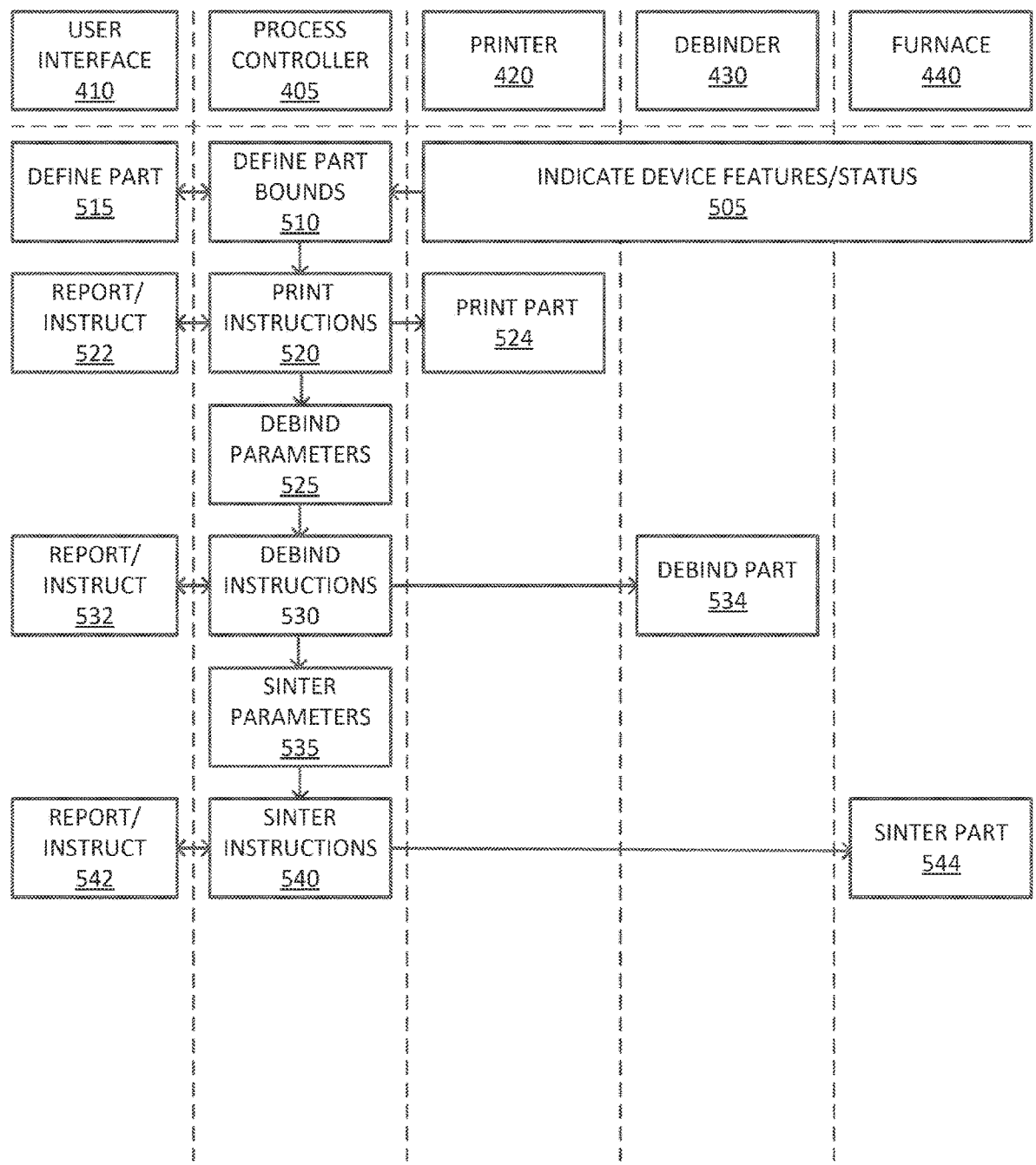
FIG. 5 is a flow diagram of a process of fabricating a part.

FIG. 5 is a flow diagram of a process 500 of fabricating a part that may be carried out by the system 400 of FIG. 4. With reference to FIG. 4, upon initial setup or in response to a prompt, the printer 420, debinder 430 and furnace 440 may communicate with the controller 405 to convey the features and/or status of each of the devices (505). For example, the devices 420 can indicate 1) capacities for accommodating parts of a maximum size and/or thickness, 2) build materials available and quantities thereof, and 3) errors, alerts or other notifications that may affect or limit the manufacturing process. Based on this information, the controller 405 can define part bounds, which can specify maximum part geometries, quantities and/or constituent materials (510).

A user may define a part (or parts) to be manufactured via the user interface 410 (515). To do so, a user may select a part from a menu at the user interface 410, may import data for the part, or may design the part directly at the user interface 410. The part may be defined by geometric parameters (e.g., a CAD file) and material(s) from which the part is to be fabricated. The user may make further adjustments to the geometric parameter, such as scaling up or scaling down the size of the finished part. Based on the desired properties of the finished part 491 (e.g., part geometry and material composition), as well as the anticipated effects on the part exerted by the printer 420, debinder 430 and furnace 440, the process controller 405 may generate print instructions for printing the part (520). The print instructions may include a toolpath (e.g., gcode) and related parameters that are transmitted to the printer 420, which then prints the green part 491 in accordance with the instructions (524). The controller 405 may also report a print status to the user via the user interface 410, and may also instruct the user on operating the printer 420 before, during and/or after the print (522). For example, the user interface 522 may display instructions for initializing or activating the printer 420, performing printer maintenance (e.g., cleaning the print nozzle or loading build material), and removing the printed green part 491 from the printer 420 once the printing is completed. The controller 405 may issue such reports and instructions based on status reports conveyed by the printer (e.g., 505) as well as the print instructions Following the printing of the green part 491, the controller 405 may determine parameters for debinding the green part 491 in the debinder 430 (525). For example, the controller 405 may determine a volume of solvent required to debind the part, a length of time to immerse the part in the solvent, circulation of the solvent, and whether to exchange solvent during the debind. If more than one green parts are available, then the controller 405 may also define a batch of parts that can be debound together. The controller 405 may determine such debind parameters based on the properties of the green part 491 (and other green parts, if available), including the geometry, material, thickness and mass of the green part 491. For example, the controller 405 may determine that a part having thicker features or greater mass may require a longer solvent immersion time. The properties of the green part 491 may be measured directly by the user and entered at the user interface 410, or may be estimated based on the print parameters for the part. The controller may also determine the debind parameters based on the capacity or status of the debinder 430 as communicated by the debinder 430 (e.g., 505). Features of the debinder 420, as well as communications between the debinder 420 and controller 405, are described in further detail below with reference to FIGS. 7-9.

Based on the debind parameters, the controller 405 determines debind instructions for the user interface 410 and debinder 430 (530). For the user interface 410, the controller 405 may present a menu of options and instructions to the user (see, e.g., FIG. 7, described below) (532). For example, the user interface 410 may 1) allow selection of one or more parts to debind, 2) instruct the user on how to place and orient the selected part(s) within a process chamber of the debinder 430, and 3) instruct the user regarding any maintenance required at the debinder 430 (e.g., removing waste or adding solvent). For the debinder 430, the controller 405 may initiate and manage the debind process based on the debind parameters and the aforementioned user input (534). For example, for the given selection of part(s), the controller 405 may configure the volume of solvent used, solvent immersion time, circulation of the solvent, whether to exchange solvent during the debind, and drying time and temperature. Once the debind is complete, the controller 405 may then instruct the user, via the user interface 410, to open the process chamber of the debinder 430 and remove the brown part(s) 492 (532).

Following the debinding, the controller 405 may determine parameters for sintering the brown part 492 in the furnace 440 (535). For example, the controller 405 may determine parameters including one or more of sintering time, temperature, gas flow rate and furnace load (i.e. a selection of parts that may be sintered concurrently). The controller 405 may determine the sinter parameters based on the properties of the brown part 492 (and other parts, if sintering concurrently), including the geometry, material, thickness and mass of the brown part 492. For example, the controller 405 may determine that a part having thicker features or greater mass may require a longer solvent immersion time. The properties of the brown part 492 may be measured directly by the user and entered at the user interface 410, or may be estimated based on the print parameters for the part. The controller 405 may also determine the sinter parameters based on the capacity or status of the furnace 440 as communicated by the furnace 440 (e.g., 505).

In an example illustrating determination of sinter parameters, the brown part 492 may be printed from 4140 alloy nominal feedstock steel. The user may select, for example, a particular material content (e.g., carbon content) of the constituent 4140 alloy steel to be present in the steel after sintering. The controller 405 may evaluate the desired carbon content input from the user and generate therefrom the sinter parameters to produce a desired carburization/decarburization effect. For example, the sinter parameters may include a configuration of the gas flow rate within furnace 440.

Adjusting the carbon content of the 4140 alloy steel may produce a wide range of ductility and/or hardness to the user for alloy steels. The user may enter a given ductility and/or hardness as a desired property at the user interface 410, and in response, the controller 405 may determine the required carbon content to achieve the desired ductility and/or hardness, and then determine the sinter parameters to produce the determined carbon content of the finished part 493. The carbon content of the finished part 493 can be altered by furnace load (i.e., the total mass of parts placed in the furnace 440) as well as gas flow rate. This is due to the effect of binder amount on carburizing potential of sintering process. Furnace load and gas flow rate are thus two sinter parameters that the controller 405 may determine and provide to the furnace 440 to adjust the final microstructure of the finished part 493, while keeping other sinter parameters (e.g., temperature, time, etc.) constant.

The controller 405 may also provide furnace load recommendations to the user via the user interface 410, allowing the user to manually adjust the furnace load. Alternatively, the furnace 440 may automatically adjust the furnace load based on sinter parameters communicated to it by the controller 405. Further, the user may enter at the user interface 410 a selection of multiple parts to be sintered concurrently and/or the total mass of the parts to be sintered in in a given sintering run, along with the desired microstructure. The controller 405 may then determine, based on the total mass of the parts and desired microstructure for a particular production run, the gas flow needed to achieve that microstructure in that particular production run.

The controller 405 may sintering parameters, as a function of the input materials properties, based on a fixed mapping. In such cases, the controller 405 may employ a look-up table (LUT), implemented in local memory, to accomplish the mapping. The contents of the LUT may be generated empirically, based on actual production runs. The contents of the LUT may alternatively be generated analytically according to formulae based on established materials theory. Alternatively, the controller 405 may produce the sinter parameters analytically, in real-time or near real-time, by a processor executing instruction code that evaluates the input materials properties according to formulae based on established materials theory.

The controller may provide further sinter parameters to accommodate particular materials or produce specific effects in the finished part 493. For example, the oxygen content in the gas flow may be varied for processing titanium-based alloys to provide variations in hardness vs. ductility of the part material, or to produce hardened oxide layers on a material such as titanium or aluminum. The controller 405 may also define sinter parameters specifying a particular cool-down rate. For example, one cool down rate may be defined for banite, and a slower cool down rate may be defined for ferrite. The controller 405 may define sinter parameters that adjust the internal sintering furnace atmosphere, vacuum level and the furnace loading, to selectively harden/carburize the parts. Certain parts may only require a selected region to be hardened (e.g., the teeth of a gear), but require other regions of the part maintain ductility (e.g., thin sections that are prone to embrittlement when too hard/carburized). Accordingly, the controller 405 may direct the printer 420 to print a thin stop-off layer on selected surfaces to prevent carburization of those selected surfaces, resulting in selective carburizing at the furnace 440.

If the brown part 492 contains substantial amounts of binding agents (e.g., as a result of incomplete debinding), the binding agents may affect the carbon content of the final part 493. In such a case, the sections under the thin stop-off described above may pick up carbon due to prolonged exposure to carbon from the binder and become harder selectively. Thus, the controller 405 may configure the sinter parameters to selectively distribute the stop-off to facilitate the sintering of functionally gradient steel. Similar techniques of distributing stop-off material may alternatively be used for oxygen hardening of titanium to facilitate the sintering of functionally gradient titanium. Similar techniques may apply to other processes, for example for processing titanium with oxygen hardening.

Based on the sinter parameters, the controller 405 determines sinter instructions for the user interface 410 and debinder 430 (540). For the user interface 410, the controller 405 may present a menu of options and instructions to the user (542). For example, the user interface 410 may 1) allow selection of one or more parts to sinter, 2) instruct the user on how to place and orient the selected part(s) within the furnace 440, and 3) instruct the user regarding any maintenance required at the furnace 440. For the furnace 440, the controller 405 may initiate and manage the sinter process based on the sinter parameters and the aforementioned user input (544). For example, for the given selection of part(s), the controller 405 may control the temperature, time, gas flow, oxygen content, and other parameters of the furnace 440 as described above. Once the sinter is complete, the controller 405 may then instruct the user, via the user interface 410, to open the process chamber of the furnace 440 and remove the finished part(s) 493 (542).

In order to increase efficiency of the manufacturing process, the controller 405 may also manage a plurality of queues. For example, the controller may maintain 1) a queue of parts to be printed, 2) a list of parts at each stage of the manufacturing process (i.e., printed, debound, sintered), and 3) the operational status of each device. Based on this information, the controller 405 can define a local order of operations (e.g., a part queue) at each device, prioritizing and grouping parts to manufacture the parts more quickly and utilize resources (e.g., feedstock, solvent) most efficiently.

In configuring the print, debind and sinter parameters and controlling the devices as described above, the controller 405 may calculate an anticpated transformation of the part at each stage in the manufacturing process. For example, the controller may calculate an anticipated 1) deformation of a part surface during the printing as a result of the part geometry and mass, 2) a portion of the part that may retain binder after debinding, or 3) uniform or uneven shrinkage of the part during sintering. Similarly, the controller 405 may calculate anticipated properties of the green part 491, brown part 492 and/or finished part 493 (including any transformations) prior to beginning the print. In response, the controller 405 may configure the print, debind and/or sinter parameters to compensate for the anticipated transformation at the same or different stage of the manufacturing process.

Thus, the controller 405 can perform a predictive analysis of the manufacturing process. For example, by analyzing the initial properties of the part to be manufactured (e.g., geometry and materials), the effects on the part exerted by each of the printer 420, debinder 430 and furnace 440 (via empirical observation and/or modeling), and the desired properties of the finished part 491, the controller 405 may then control the system 400 to ensure that the finished part 491 is produced within acceptable tolerances. By tracking operations at each of the devices in the system 400, as well as the status of each of the unprinted, green and brown parts within the manufacturing queue, the controller 405 can optimize the efficiency of the system 400. For example, the controller 405 can group multiple parts for printing, debinding or sintering, and can define a part queue at each of the printer 420, debinder 430 and furnace 440 to efficiently occupy the runtime of each device. Further, the process controller 405 order a part within the queue based on the properties of the part relative to properties of other parts in the queue.

Figure 6A:
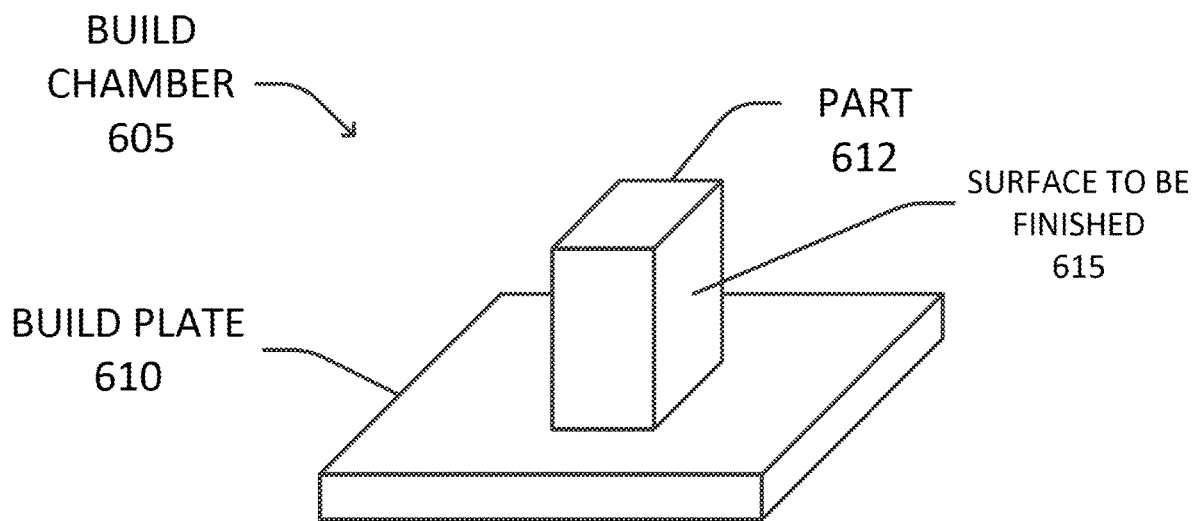
FIGS. 6A-B illustrate orientation of a printed part on a build plate.
Figure 6B:
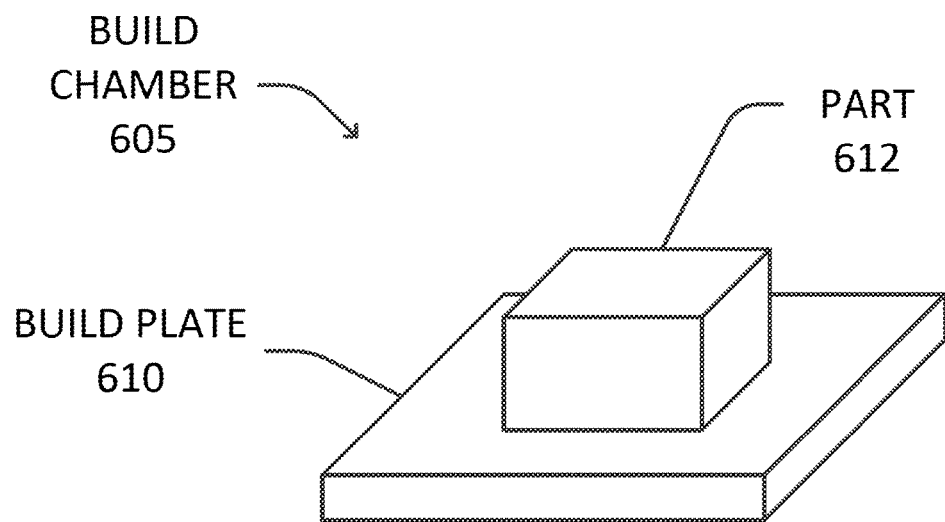

FIGS. 6A-B illustrate orientation of a printed part on a build plate. With reference to FIG. 4, in some embodiments, a finished part 493 may require further processing upon exiting the furnace 440. For example, some surfaces of the finished part 440 may require grinding, sanding or filing to remove imperfections or rough portions to produce a consistent or smooth surface. Such a process may involve finishing the part by hand, which may be time-consuming and laborious, as well as unfeasible for larger production volumes.

Accordingly, the controller 405 may orient the part during the initial print to minimize the need for further processing. For example, as shown in FIG. 6A, a part 612 is printed on a build plate 610 within a build chamber 605 of a printer (e.g., printer 420). A surface 615 requiring post-sinter finishing occupies an upright side of the part 612. This surface may require the post-sinter finishing because the printer may deposit material unevenly across the upright surface. In contrast, a bottom surface of the part 612, which is aligned with the surface of the build plate 610 (or an interface layer on the build plate, not shown), may exhibit a smoother, more consistent surface as a result of the material distributing against the build plate 610. Thus, a part surface that is printed against the build plate 610 may not require, or require less, post-sinter finishing. Likewise, due to the effects of gravity settling the deposited material during printing, a part surface oriented parallel to the surface of the build plate 610 (e.g., an upper surface), or at an angle other than perpendicular to the build plate 610, may require less finishing than a surface printed perpendicular to the build plate 610.

Accordingly, the controller 405 may identify (based on the part properties and/or user entry) which of the surfaces of the part 612 may require post-sinter finishing and, based on this indication, control the printer 420 to print the part 612 in an orientation to reduce or minimize post-sinter finishing. As shown in FIG. 6B, for example, the surface to be finished (615 of FIG. 6A) is oriented to align with the surface of a build plate 610. As a result, the surface 615 may require less or no finishing after exiting the furnace 440. If the controller 405 identifies more than one surface requiring post-sinter finishing, it may control the print orientation of the part 612 to minimize the total surface area of the part 612 requiring post-sinter finishing.

Figure 7:
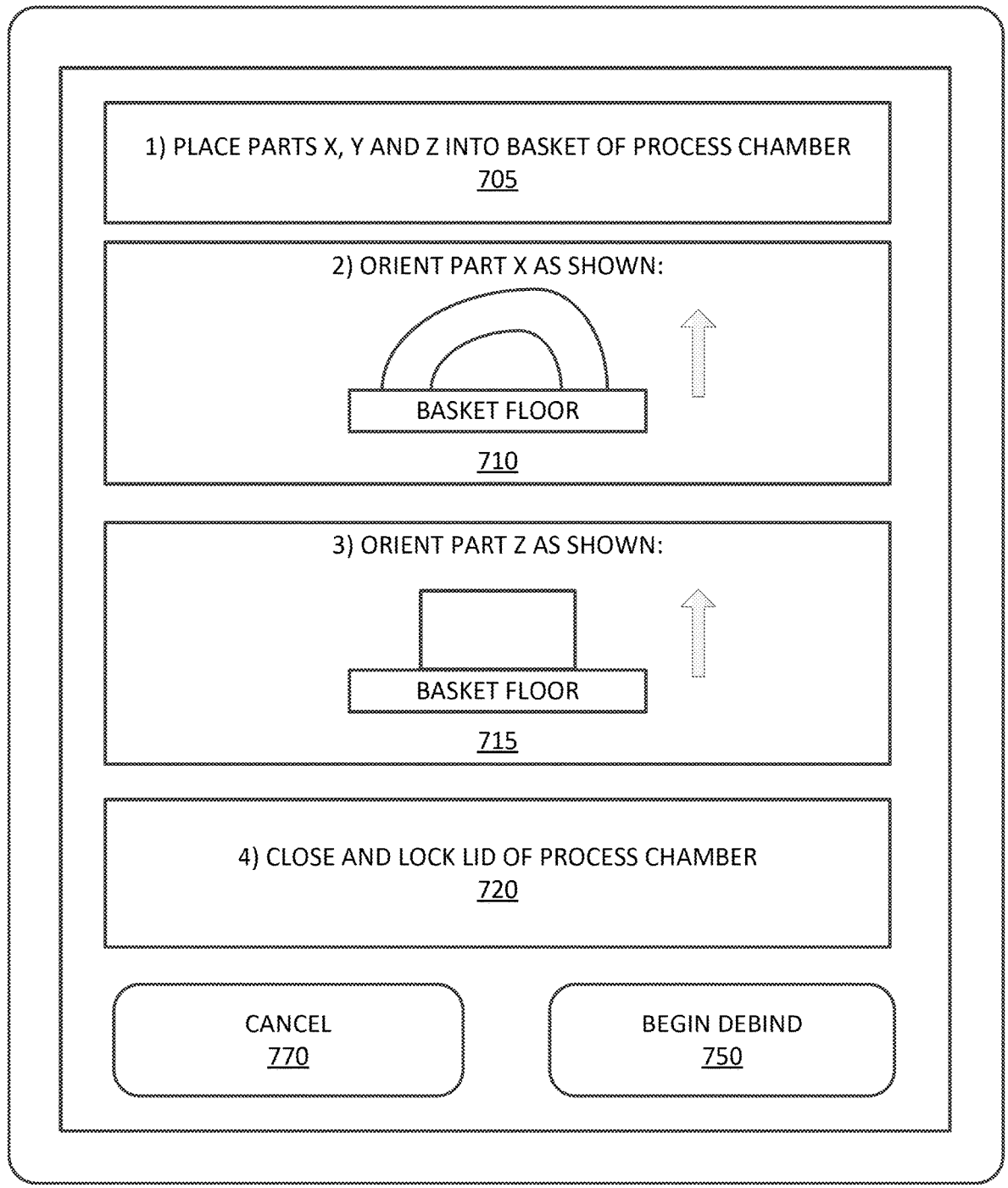
FIG. 7 illustrates a user interface configured to guide a debind process.

FIG. 7 illustrates a display 700 presented by a user interface and configured to guide the user through a debind process. With reference to FIGS. 4 and 5, the display 700 may be presented by the user interface 410 before beginning the debind process (534), as a portion of the interaction with the user regarding the debind (532). The display 700 may be preceded by another menu allowing the user to select the part(s) for debinding. As shown, the display 700 presents a series of instructions guiding the user in preparing the green part(s) and debinder for the debind process. First, the display 700 instructs the user to place the selected parts (identified by corresponding codes, names or illustrations) into the basket of the process chamber of the debinder (705). For parts requiring a particular orientation in the process chamber, the display may then instruct the user on how to orient those parts, providing an illustration for each (710, 715). Once the parts are placed and oriented (and, optionally, the user verifies the same through the user interface 410), the display 700 instructs the user to close and/or lock the lid of the process chamber (720). The user may then select a button to begin the debind (750) or cancel (770).

Figure 8:
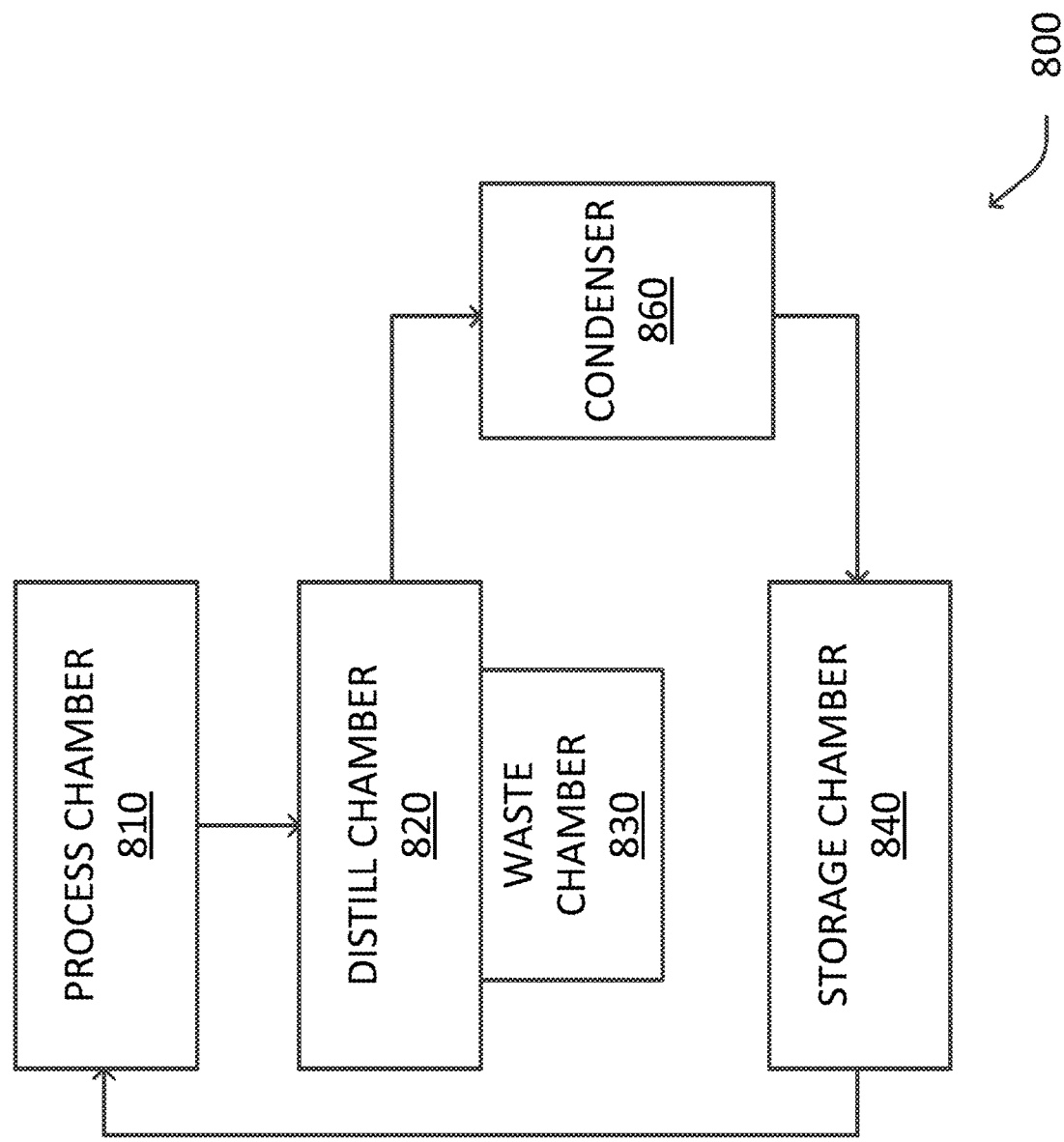
FIG. 8 is a block diagram of a debinder system for debinding printed parts.

FIG. 8 is a schematic of a debinder system 800 for debinding printed parts. The debinder system 800 may be employed to debind fabricated green parts that are printed as described above with reference to FIGS. 1-7, and may be implemented as the debinder 430 of FIG. 4. The system 800 includes a process chamber 810, into which the fabricated green parts may be inserted for debinding. A storage chamber 840 stores a volume of solvent for use in the debinding process. The storage chamber 840 may be filled and refilled with solvent via a port at the storage chamber 840. Alternatively, the storage chamber 840 may be configured to be removable and replaceable to maintain a sufficient amount of solvent within the system 800. For example, the storage chamber 840 may be removed and replaced by a replacement storage chamber (not shown) to replenish the solvent in the system 800, or may be removed, refilled with solvent, and then reconnected within the system 800.

The distill chamber 820 collects the post-debinding solution from the process chamber 810 following the debinding process, and enables distillation of the solvent. A waste chamber 830 may be coupled to the distill chamber 820, and collects waste accumulated in the distill chamber 820 as a result of distillation. The waste chamber 830 may be configured to be removable and replaceable after a number of distillation cycles, wherein the waste chamber 830 may be removed and replaced by a replacement waste chamber (not shown), or may be removed, emptied of waste, and then reconnected to the distill chamber 820. A condenser 860 operates to condense vaporized solvent from the distill chamber 820 and return the liquid solvent to the storage chamber 840.

Figure 9:
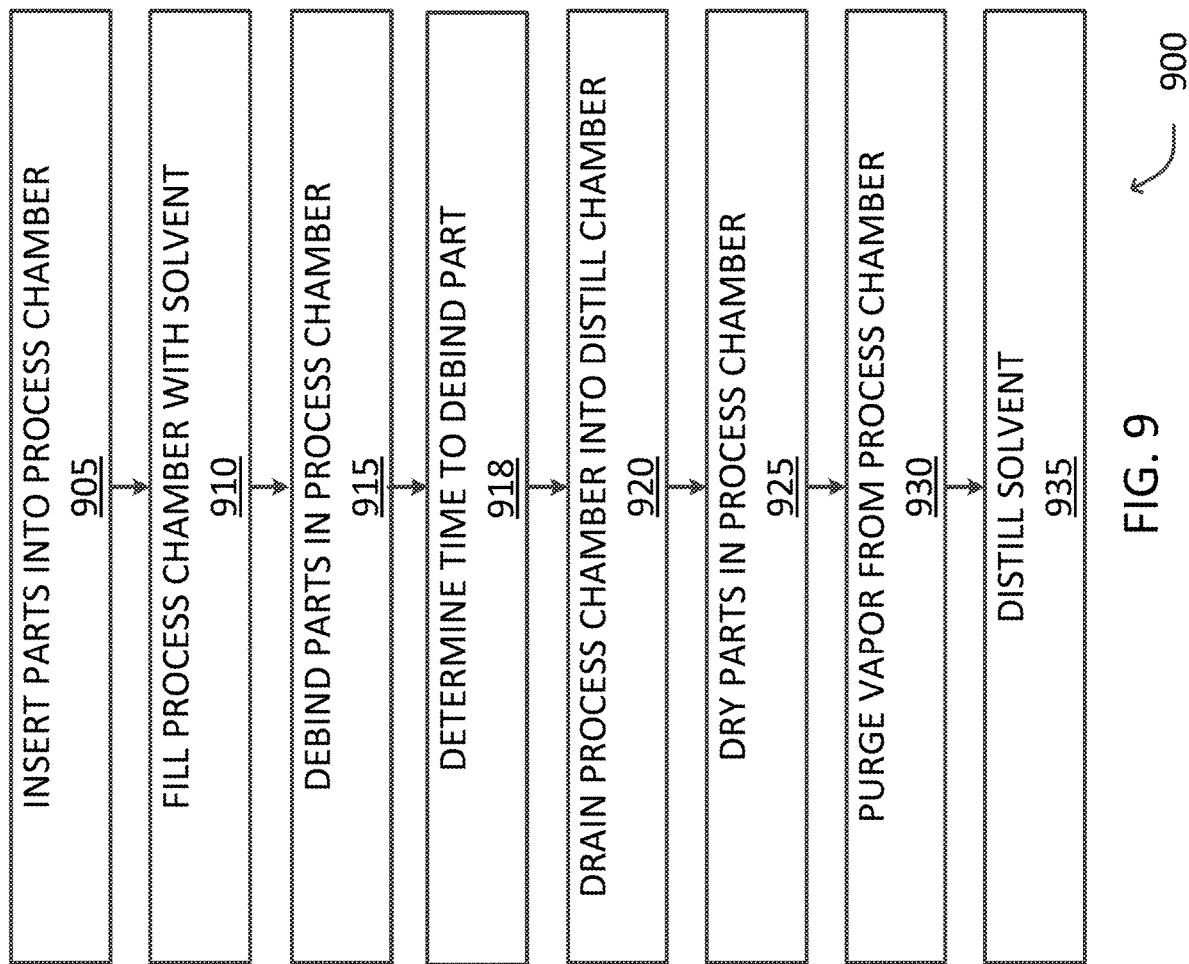
FIG. 9 is a flow diagram of a debinding process.

FIG. 9 is a flow diagram of a debinding process 900 that may be carried out by the debinder system 800 of FIG. 8. The process 900 may be incorporated into the process 500 of FIG. 5 described above, and particularly the operations of defining the debind parameters 525, determining the debind instructions 530, interfacing with the user 532, and debinding the part 534. With reference to FIGS. 4 and 8, a user may insert one or more fabricated green parts 491 into a basket within the process chamber 810 (905). The controller 405, communicating with the user via user interface 410, may maintain information regarding the parts for debinding (e.g., material, geometry). Based on this information, the controller 405 may instruct the user on which of the available parts to place in the process chamber 810 and/or how to position and orient the parts in the chamber 810. The controller 405 may also control some or all of the debinding process 900. For example, the controller 405 may determine debind parameters based on the properties of the inserted parts, such as solvent volume in the process chamber, debinding time, and solvent circulation.

After inserting the parts into the process chamber 810 according to the presented instructions, the user may close a lid of the process chamber 810, optionally enter a measured weight of the green parts (which may be used to determine the volume of solvent used), and initiate the debinding process. Once initiated, solvent is pumped from the storage chamber 840 into the process chamber 810 up to a level as determined by the controller 405 (910). The process chamber 810 then raises the temperature of the solvent to a controlled value (e.g., 46° C.) via one or more heaters, and, optionally, engages a pump to circulate the solvent within the process chamber 810 (915). The temperature and circulation may be maintained for a length of time determined by the controller 405 (i.e., "debind time"). The controller 405, the debinder 800, or another device may determine the time to debind the part to provide sufficient debinding based on the geometry and/or weight of the green parts (918). Embodiments for determining the time to debind the part are described in further detail below. During this time, the solvent dissolves the binder within the green parts, and the liquid in the process chamber 810 becomes a solution containing the binder.

Upon reaching the debind time, the part may be removed from the solvent. Upon removal, the part may retain a small portion (e.g., 10% or less) of the binder, which can be subsequently removed via thermal debinding or a subsequent chemical debinding. The process chamber 810 drains the solution into the distill chamber 820, thereby removing the part from the solvent (920). Once drained, the temperature in the process chamber 810 may be controlled at a higher temperature (e.g., 50° C.) to facilitate drying of the brown parts (925). During this time, solvent vapor may be vented to the storage chamber 830 and/or to the distill chamber 820. Upon drying the brown parts, the temperature of the process chamber 810 may be reduced (e.g., by disabling the corresponding heater(s)), and a fan or other mechanical means (e.g., a blower, pump, or compressor) may be engaged to facilitate purging the remaining solvent vapor from the process chamber 810 and into the storage chamber 830 and/or to the distill chamber 820 (930). After purging the solvent vapor and, optionally, manually or automatically locking the process chamber 810 for a time allowing the part to cool sufficiently, the user may then open the lid and remove the brown parts from the process chamber 810.

The system 800 may then undergo a process to distill the solvent from the solution drained from the process chamber 810 into the distill chamber 820 (935). The waste chamber 830 may be positioned below the distill chamber 820 and connected by a coupling enabling the solution to flow into the waste chamber 830. The waste chamber 830 (and, optionally, the distill chamber 820) may be heated to a given temperature (e.g., 50° C.) to cause the solvent to evaporate from the solution. The condenser 860 collects the solvent vapors, condenses the vapors to a liquid, and pumps the liquid solvent to the storage tank 840. Concurrently, the waste remaining from the distilling is collected at the bottom of the waste chamber 830.

After the distilling is complete, the waste may be allowed to cool and dry. Periodically, or upon detecting that the collected waste reaches a threshold volume, the waste chamber 830 may be removed and replaced by a replacement waste chamber, or may be removed, emptied of waste, and then reconnected to the distill chamber 820.

Optionally, for parts requiring a larger volume of solvent or longer debinding times, the solvent may be exhanged in the process chamber 810 during a debinding. For example, following draining the process chamber 810 (920), the operations of filling the process chamber with solvent (910), debinding (915) and draining (920) may be repeated prior to drying the parts (925). A distill operation (935) may also be performed for the exchanged solution concurrently with the debinding using the subsequent solvent. Exchanging the solvent during a debinding may improve the effectiveness and debind time particularly for larger or denser parts, or for parts having thicker geometries.

As indicated above, the storage chamber 840 may be filled and refilled with solvent via a port at the storage chamber 840, or may be removed and refilled or replaced by a replacement storage chamber. Alternatively, the storage chamber may be filled with solvent via the process chamber 810. For example, a volume of solvent may be poured into the process chamber 810, where it is permitted to flow into the storage chamber 840. The process chamber 810 may then be purged (930) to ensure that no solvent vapors remain in the process chamber 810. The system 800 may then enable the user to add green parts to initiate the debinding process 500.

As a result of the debinding process 900, the system 800 provides several advantages. By controlling the process parameters (e.g., solvent volume, debind time and circulation) based on the properties of the green parts (e.g., mass and geometry), the system 800 makes efficient use of the solvent. By distilling the solvent after a debinding, the system 800 also conserves and recycles the solvent for future use. The system 800 may be embodied in a compact, self-contained unit that is suitable for an office or workshop environment. In particular, the system 800 can contain all solvent vapor and waste within the unit, thereby maintaining a safe environment around the system 800. Further, the system 800 can be implemented with the controller 405 or another control system (integral to the system 800 or operated by a computer workstation or cloud network) to control the debind process and guide the user on operation (e.g., insertion/removal of parts and waste removal), making the system accessible to a wide range of users.

In further embodiments, the process chamber 810, distill chamber 820, waste chamber 830, and storage chamber 840 may be implemented in alternative configurations. For example, the distill chamber 820 and waste chamber 830 may be implemented as a single chamber, which may be removable to be cleaned of waste and reconnected, or may be replaced by a replacement chamber. Further, the distill chamber 820 and waste chamber 830 may also serve as the storage chamber 840, whereby the distill chamber 820 distills the solvent, via a condenser, into the process chamber 810. In such an embodiment, the process chamber 810 may include divisions or sub-chambers to hold the solvent prior to a debinding operation.

Determination of Time to Debind a Part

Example embodiment enable the time to debind a part to be determined based on the geometry of the part, which can be derived from CAD drawings, print instructions such as toolpaths, or other information defining the part. From this geometry, example embodiments can predict the time required for a binding agent of a part to be substantially or fully removed from the part through chemical dissolution when the part is immersed in a solvent. As a result, the debind process can be terminated immediately or shortly after the part is debound, thereby minimizing the occupation time of the debinder and improving the speed of the additive manufacturing process. Further, the debind completion time can be predicted, and an indication of the completion time, as well as the current progress of the debind, can be reported to the user. Although embodiments below describe chemical debinding, in further embodiments, the time to debind a part via thermal debinding may be determined alternatively or in addition to a chemical debinding.

Figure 10:
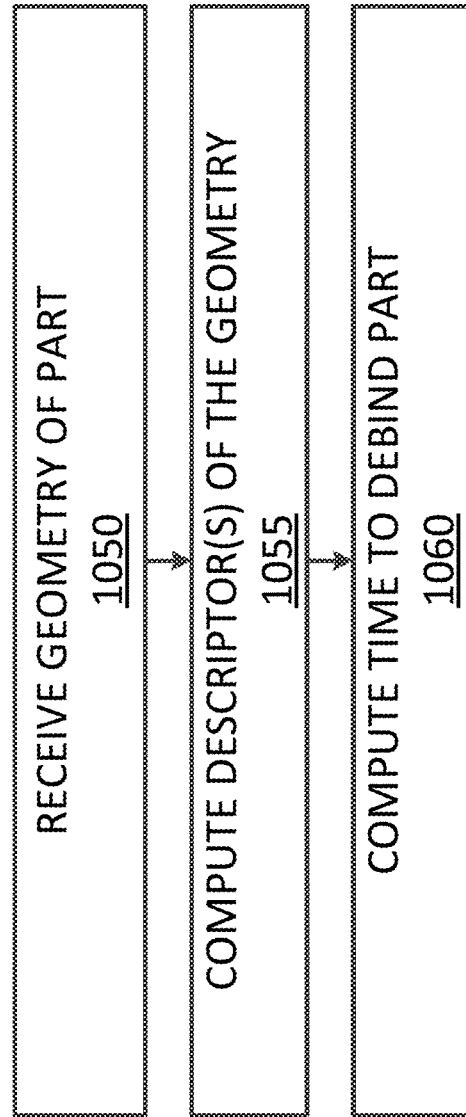
FIG. 10 is a flow diagram of a process of determining a time to debind a part in one embodiment.

FIG. 10 is a flow diagram illustrating a process 1000 of determining a time to debind a part in an example embodiment. With reference to FIGS. 4 and 8, the process 1000 may be carried out by one or more of the controller 405, the debinder 800, or another device before or during a process of debinding the part. For example, the process 1000 may be carried out before or during the debinding process 900 described above with reference to FIG. 9. The geometry of the part may be received, where the geometry may include one or more of a CAD drawing, print instructions, and other properties or parameters defining the part (1050). From this geometry, descriptors may be computed (1055). Descriptors may include one or more properties of the part that relate to the time required for diffusion of a solvent through the part. In applications of thermal debinding, the descriptors may relate to the time required for the binding agent to be evaporated from the part. Example descriptors are described in further detail below. Based on the descriptors, the time required to debind the part may then be determined (1060).

Example embodiments may be applied to parts of a range of different geometries or compositions. For example, a "full-filled" part may be composed of a solid material occupying a substantial portion or all of its internal volume. In contrast, an "infilled" part may comprise a shell encompassing an interior cellular structure, where the cellular structure contains voids absent of material. Example embodiments as applied to full-filled and infilled parts are described, in turn, below.

Determination of Time to Debind a Full-Filled Part

Many debinding and sintering processes are diffusively controlled, meaning that the process is a function of the diffusion of a substance through a part. Solvent debinding of parts, in particular, is a diffusively-controlled process for many parts. Thermal debinding is also a diffusively-controlled process for many binder-powder combinations. For such diffusively-controlled scaling, the largest diffusion length in the part controls the kinetics for the process to reach completion. The diffusion length may be a maximum length to which a substance must be diffused into or out from the part.

For small parts, the debinding process may instead be interface-reaction limited, depending on the solvent and binder system chosen. However, for large parts, the worst-case complexity in scaling of debinding times may be given by a quadratic scaling of debinding times with respect to diffusion length:

$$t_{debind} \propto L^2 \tag{1}$$

Thus, if a diffusion length of a 3D-printed geometry (i.e., the rate-limiting cross-section for the entire part) can be determined, this length-scale can be used to determine the time over which the debinding must take place to guarantee process completion. That is, an asymptotically optimal bound on the scaling of time for fully-filled parts in solvent debinding, heat transfer in sintering, and mass transfer in thermal debinding is with the square of the diffusion length of the part:

$$t_{debind} = \Theta(L^2) \tag{2}$$

For many cases, the diffusion length for an arbitrary geometry can be calculated by a set of geometric analyses aimed at defining the "effective thickness" of the part, which may be determined based on the deepest point from any surface in the geometry. The deepest point may be a descriptor of the part identified as the point that is a maximum distance from any surface of the representation. The effective thickness, in turn, may be a linear function of the maximum distance. The deepest point and effective thickness may be determined in a number of different ways. In one example as described below with reference to FIGS. 11A-B, the largest sphere that fits inside the part may be calculated. In a second example, described below with reference to FIGS. 12-13, a set of shelling operations (e.g., uniformly displacing the exterior of the geometry inward on its local normal vectors and recalculating a new "shell," and performing the same operation recursively) may be performed until the shelling can no longer continue because the shell achieves zero volume. The largest sphere that can fit inside a geometry may be equal to the deepest shelled distance in the part in the limit as the shelling distance at each step approaches zero. Thus, a debinding schedule for a part may be predicted, wherein the diffusion length is calculated as the largest sphere which can fit inside the outer envelope of the part, and the timescale of the schedule can be scaled according to the computed diffusion length of the part raised to a power. The power may have an exponent greater than 1. For example, the power may have an exponent of 2 as shown in equation 2 above, or may have an exponent within a range approximate to 2, such as a range of 1.6-2.4.

Figures 11A, 11B:
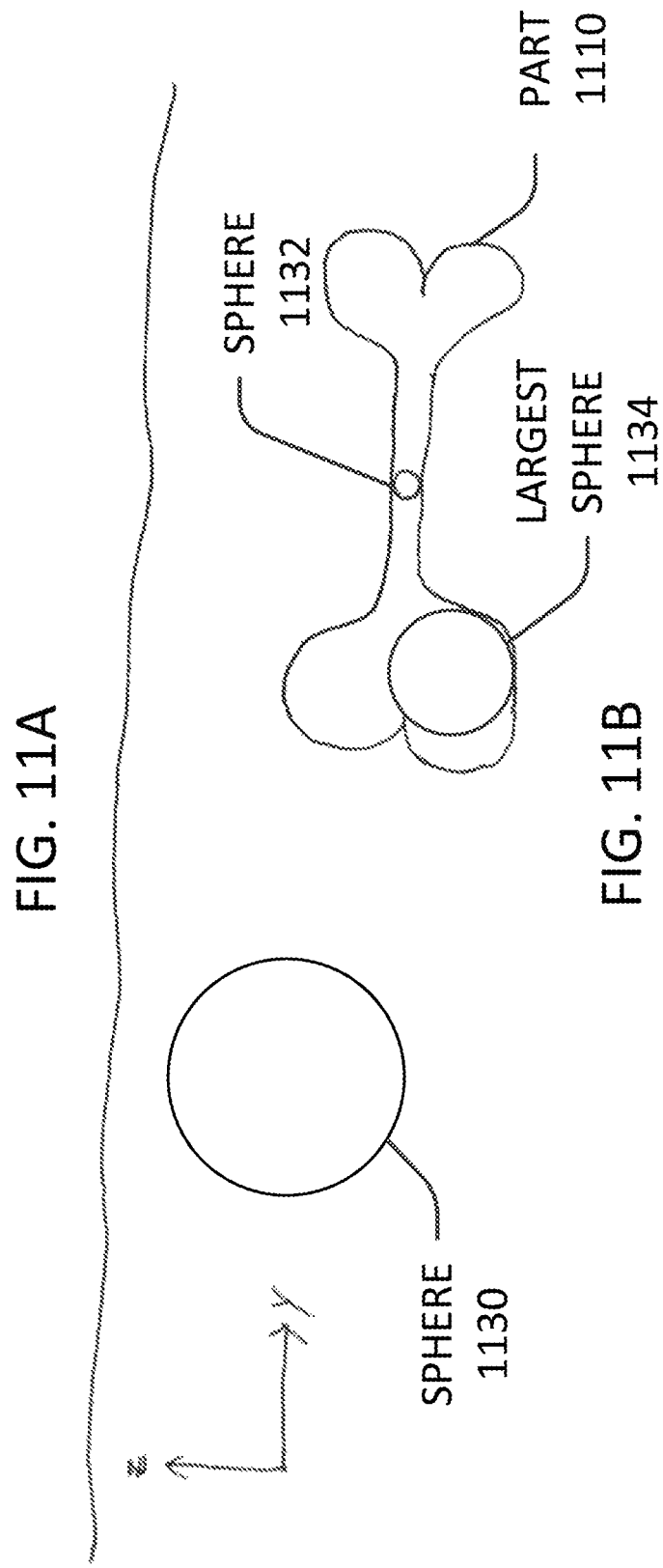
FIGS. 11A-B illustrates a geometry of a full-filled part in one embodiment.

FIGS. 11A-B illustrates a geometry of an example full-filled part 1110 that is subject to a calculation of diffusion length in one embodiment. FIG. 11A illustrates the part 1110 in three dimensions, while FIG. 11B illustrates a two-dimensional cross-section of the part 1110. To calculate the diffusion length of the part 1110, a series of computations may first determine the largest (or near-largest) sphere that can be entirely encompassed by the interior volume of the part 1110. A first example sphere 1130 is too large to be encompassed as such. A second sphere 1132, shown inside the part 1110, is small enough to be contained within the part 1110, but is not the largest possible sphere that can fit inside the part 1110. In contrast, the largest sphere 1134 occupies the largest spherical volume within the part 1110.

The largest sphere 1134 may be determined in a number of different ways. For example, a random sampling of points from the part geometry may be produced. For each of the points, a distance from the point to a closest surface may be calculated. The radius of the largest sphere 1134 may then be determined as a maximum of the calculated distances. Thus, the center of the sphere 1134 may coincide with a point interior to the part 1110 that is a maximum distance from any surface of the printed part 1110. As an alternative to the random sampling of points, a uniform grid sampling of points may be generated at the part geometry.

The center of the largest sphere 1134 may coincide with a point interior to the part 1110 that is a maximum distance from any surface of the part 1110. Thus, the center of the sphere 1134 may indicate the deepest point of the part 1110, and the radius of the sphere 1134 may indicate the diffusion length of the part 1110. Accordingly, based on the geometry of the sphere 1134, the time to debind the part 1110 can be determined as described above.

Figure 12:
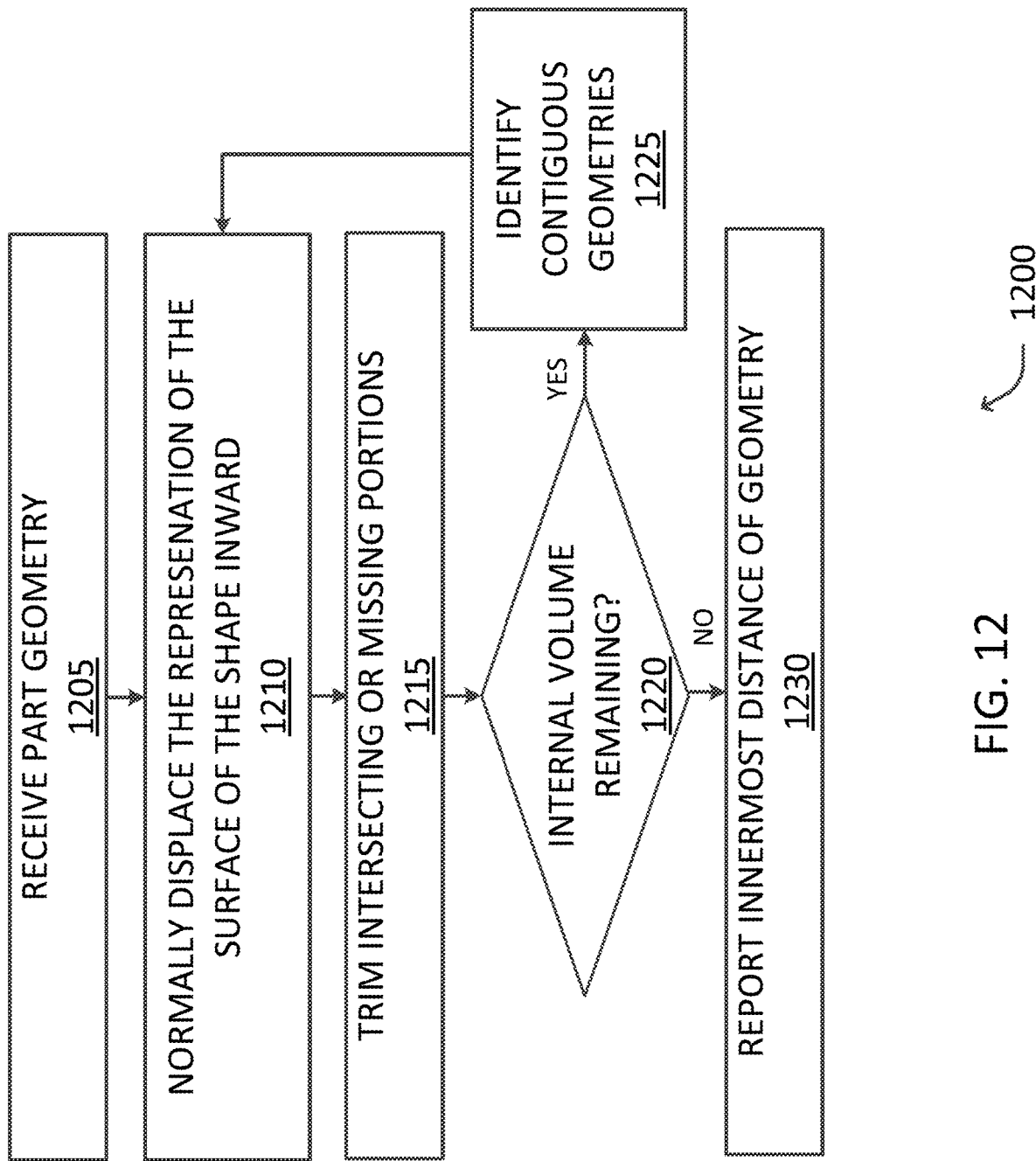
FIG. 12 is a flow diagram of a process of determining an effective thickness of a part.

FIG. 12 is a flow diagram illustrating a process 1200 of determining an effective thickness of a part in a further embodiment. The process 1200 comprises a series of shelling operations, generating a sequence of smaller shell geometries based on the geometry of the outer surface of the part. The process 1200 is described below with reference to FIGS. 13A-B.

Figure 13A:
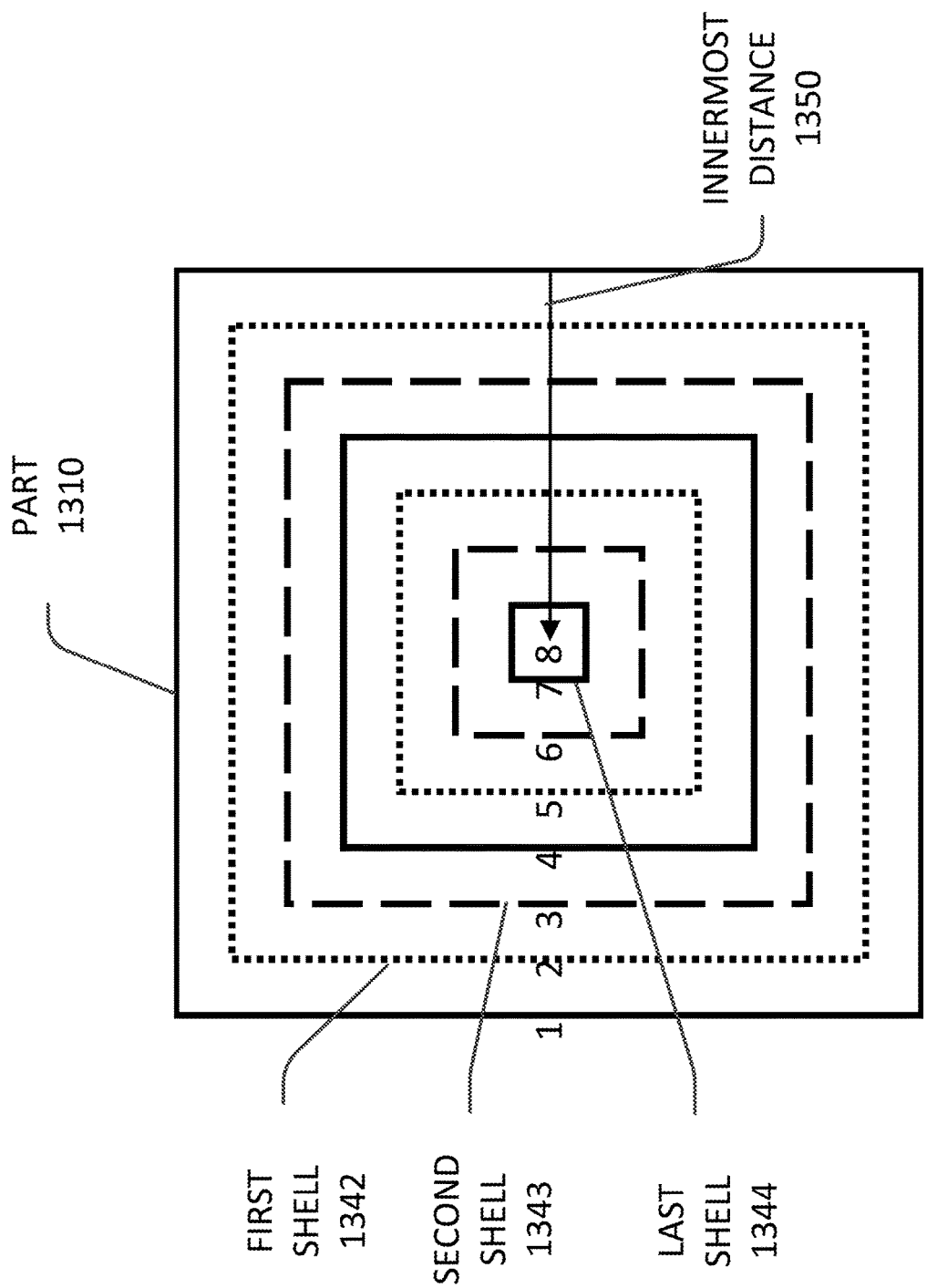
FIGS. 13A-B illustrate parts in one embodiment.

FIG. 13A illustrates a cross-section of a part 1310 having a cubic geometry. With reference to FIG. 12, upon receipt of the geometry of the part 1310 (1205), a representation of the outer surface of the part 1310 may be normally displaced inward, producing a first shell 1342 (1210). As shown, the first shell 1342 occupies an internal volume of the representation of the part 1310, and has a geometry corresponding to a displacement of a surface inward along its local normal vector relative to a geometry of the part 1310. Optionally, intersecting or missing portions of a preliminary shell produced by the above operation may be trimmed from the shell (1215). If there is internal volume of the part that remains inside the last-generated shell (1220), then the last-generated shell may be analyzed to determine its contiguous geometries (1225), and the shelling operation (1210) may be repeated, producing a shell (e.g., second shell 1343) that has a geometry corresponding to a displacement of a surface inward along its local normal vector relative to a geometry of a preceding reduced part (e.g., the first shell 1342).

The shelling operation (1210) may be repeated a number of times until a last shell 1344, having either no interior volume or an interior volume below a given threshold, is generated (1220). From the location of the last shell 1344, an innermost distance 1350 (indicating the distance from the nearest surface of the part 1310 to the last shell 1344) may be measured. Thus, the location of the last shell 1344 may indicate the deepest point of the part 1310, and the innermost distance 1350 may indicate the diffusion length of the part 1310. Accordingly, the innermost distance 1350 can be reported (1230), and the time to debind the part 1310 can be determined based on the innermost distance 1350.

Figure 13B:
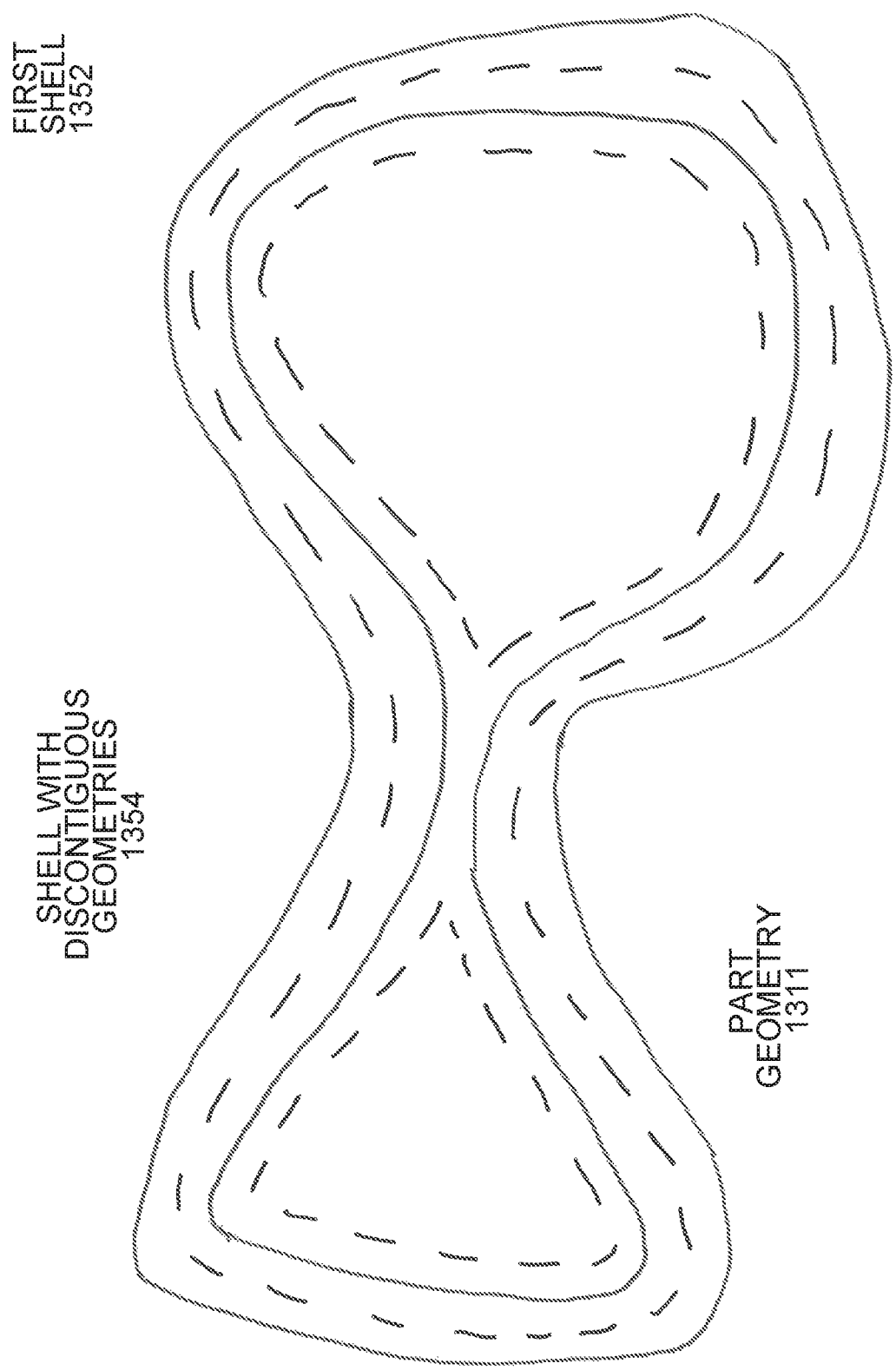

FIG. 13B illustrates a cross-section of a part 1311 in a further embodiment. In contrast to the cubic geometry of the part 1310, the part 1311 has a geometry that can create a shell with discontiguous geometries during the process 1200. As shown, a first shell 1352 exhibits a single, contiguous geometry. However, a subsequent shell 1354 exhibits a discontiguous geometry, comprising two shapes that are not connected. In such a case, the shelling process (1210) may be repeated for both of the shapes until either 1) only one shape having an internal volume remains, and the remaining shape is then further reduced until it has no internal volume; or 2) both shapes are reduced to having no internal volume in the same cycle. In the case of (2), the innermost distance may be measured for either of the shapes of the last shell.

Determination of Time to Debind an Infilled Part

In the case of an infilled part, for a small-to-medium-sized molecule (e.g., having molecular weights up to approximately 10,000), the diffusivity of the molecule in a solvent may be many times higher than the effective diffusivity of the same molecule inside a powdered body filled with high polymer (e.g., at least 40×, and up to 1000×). For higher-molecular weight molecules, diffusing in a solvent versus a powdered preform having interstices filled with high-polymer, the difference in diffusivity is even higher. Therefore, the open parts of the structure can be considered approximately infinitely diffusive, and the topology of the connections between the cells (i.e., the connectivity of the diffusion "superhighways") determines the debinding times for open cellular structures, and the sum of thicknesses of the walls arranged in series correctly determines the debinding timescale for closed-cell cellular structures.

FIGS. 14A-B illustrate a part 1410 in a further embodiment, where FIG. 14A is a top-down cross-section, and FIG. 14B is a side cross-section. The part 1410 includes an outer shell 1420 encompassing an infill having a cellular structure 1430. The shell 1420 includes side walls 1422, a ceiling 1424, and a floor 1426. The cellular structure 1430 comprises a number of interconnected cells (e.g., cell 1440), each cell containing a void. The part 1410 exhibits a honeycomb structure, which may comprise a two-dimensional array of polygons that pack to fill a plane, the material being axially symmetric in the third axis. A honeycomb structure may comprise a cellular material wherein the voids extend from one end of the material to the other along a single axis, and the voids are largely parallel to one another along their major axes. In the plane perpendicular to the axis of parallelism of the voids, the cellular walls of the structure may have a substantially uniform size and shape. A void of each honeycomb cell may be in geometric contact with the shell. A honeycomb structure is not specific to a hexagonal cell shape as exhibited by the part 1410, and may instead comprise cells of a different shape in the x-y plane, such as a square or rectangular shape.

For closed-cell infilled parts such as the part 1410, a time required to debind the part can be determined by computing a length of a longest cell along an axis of symmetry of the infill structure. The time of exposure can then be scaled according to the length of the longest cell raised to a power. Example embodiments, described below, provide for such computation and scaling.

Figure 15A:
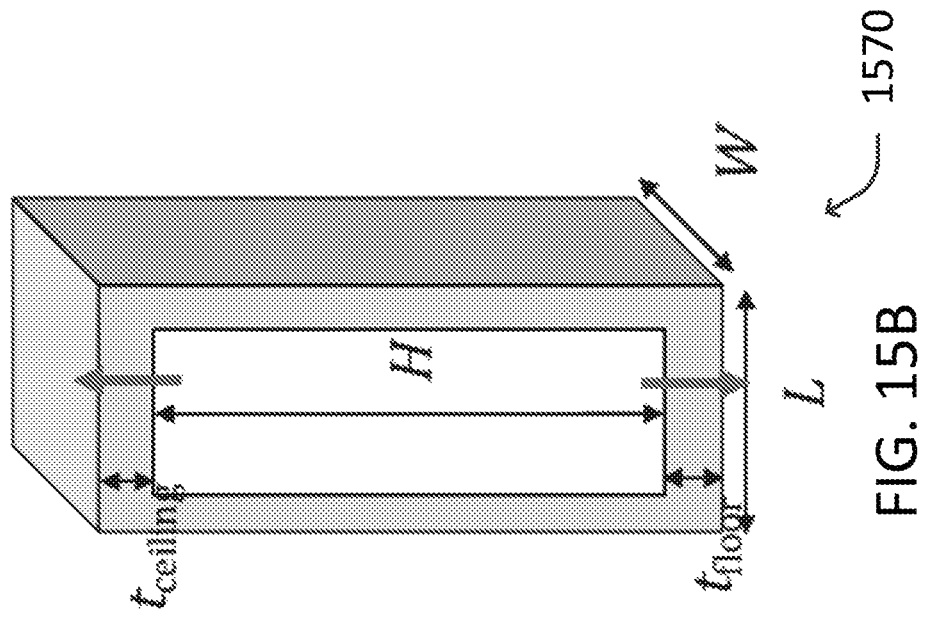
FIGS. 15A-B illustrate representations of a single cell of an infilled part.
Figure 15B:
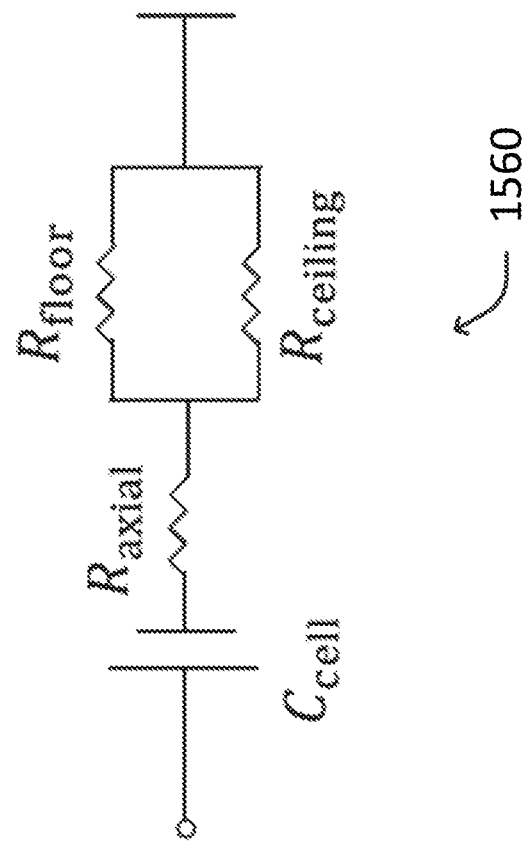

FIGS. 15A-B illustrate representations of a single cell of an infilled part that may be implemented to model a debinding process. FIG. 15A illustrates a resistor-capacitor (RC) circuit 1560 that may be referenced as a representation of an infilled part during a debinding process. FIG. 15B illustrates a single cell 1570 of an infilled part, such as the cell 1440 of FIGS. 14A-B.

With reference to FIGS. 14A-B, the part 1410 is a closed-cell infilled part that has interconnected porosity only in the vertical direction (z-axis). In this type of structure, the fast diffusion path is in the direction of the z-axis. An upper bound for debinding and/or sintering times may be approximated by presuming that no binder diffuses laterally out of the cells (i.e., to neighboring cells), and that the binder only diffuses out the of top and bottom of the cells (i.e., through the floor 1426 and ceiling 1424). In such a case, the debinding process of the part 1410 may be modeled as the discharging of a capacitor. As shown in the circuit 1560 of FIG. 15A, a single cell 1440 may be represented by a capacitor $C_{cell}$, and the top and bottom layers of the cell 1440 may be represented by resistors $R_{floor}$, $R_{ceiling}$. The kinetics of the discharge of the capacitor $C_{cell}$ scale as the characteristic time of the RC circuit 1560, which may be expressed by the following relation:

$$R_{floor,ceiling} \propto \frac{t_{floor,ceiling}}{\text{area over which binder flux occurs}} \quad (3)$$

Here, $t_{floor,ceiling}$ refers to the thickness of the top and bottom of the infill cell respectively. Depending on the approximations made, the area over which binder flux occurs could be considered the area of the cell 1570 or the area of the cell 1570 minus the area covered by toolpathing. Representing the cell 1570 with the dimensions as shown in FIG. 15B, the following equation may be obtained:

$$\text{area over which binder flux occurs} = LW \quad (4)$$

Alternatively:

$$\text{area over which binder flux occurs} = LW(1-\phi) \quad (5)$$

Here, $\phi$ is the areal fraction of the cell covered by infill. The capacitance $C_{cell}$ representing the cell 1570 may be expressed by the following relation:

$$C_{cell} \propto (\text{volume of material to be discharged}) = LWH\phi \quad (6)$$

By implementing the scaling analysis and modeling debinding as discharging of an RC circuit as described above, the scaling of a debind time for an infilled cell can be approximated. Applying such a solution to the tallest infill cell of a part may provide a rigorous upper bound on the time to debind the part.

Figure 16:
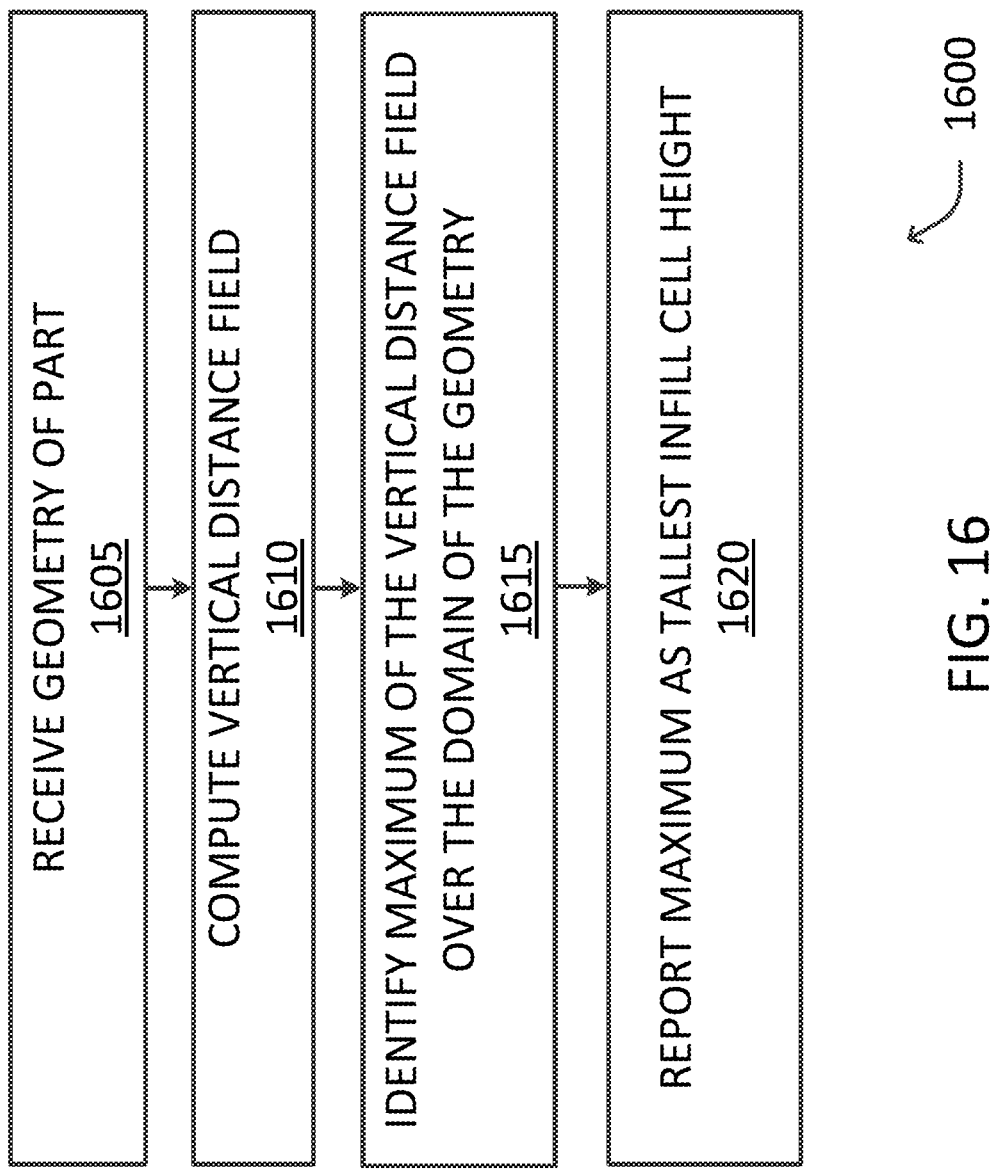
FIG. 16 is a flow diagram of a process for determining a tallest infill cell height of a part.

FIG. 16 is a flow diagram of a process 1600 for determining a tallest infill cell height of a part. With reference to FIGS. 15A-B, many of the parameters described above may be computed by CAD slicing software. To determine the tallest infill cell height from a received part geometry (1605), a vertical distance field in the geometry may first be computed (1410). To do so, the process 1600 may compute the distance a ray projected vertically downward from all upward facing surfaces (e.g., a surface with a component of its surface normal lying along the infill direction axis, which is typically the vertical direction) extends before the ray intersects with another surface in the part. The process 1600 may then identify the maximum of the vertical distance field over the domain of the part geometry (1615). This maximum can be determined by computing this ray projection distance in a sufficiently tightly-spaced grid across the part geometry, and identifying the maximum value of this computation. The thickness of the top and bottom layers may be subtracted from this maximum value, and the resulting value may be reported as the tallest infill cell height (1620).

Figure 17:
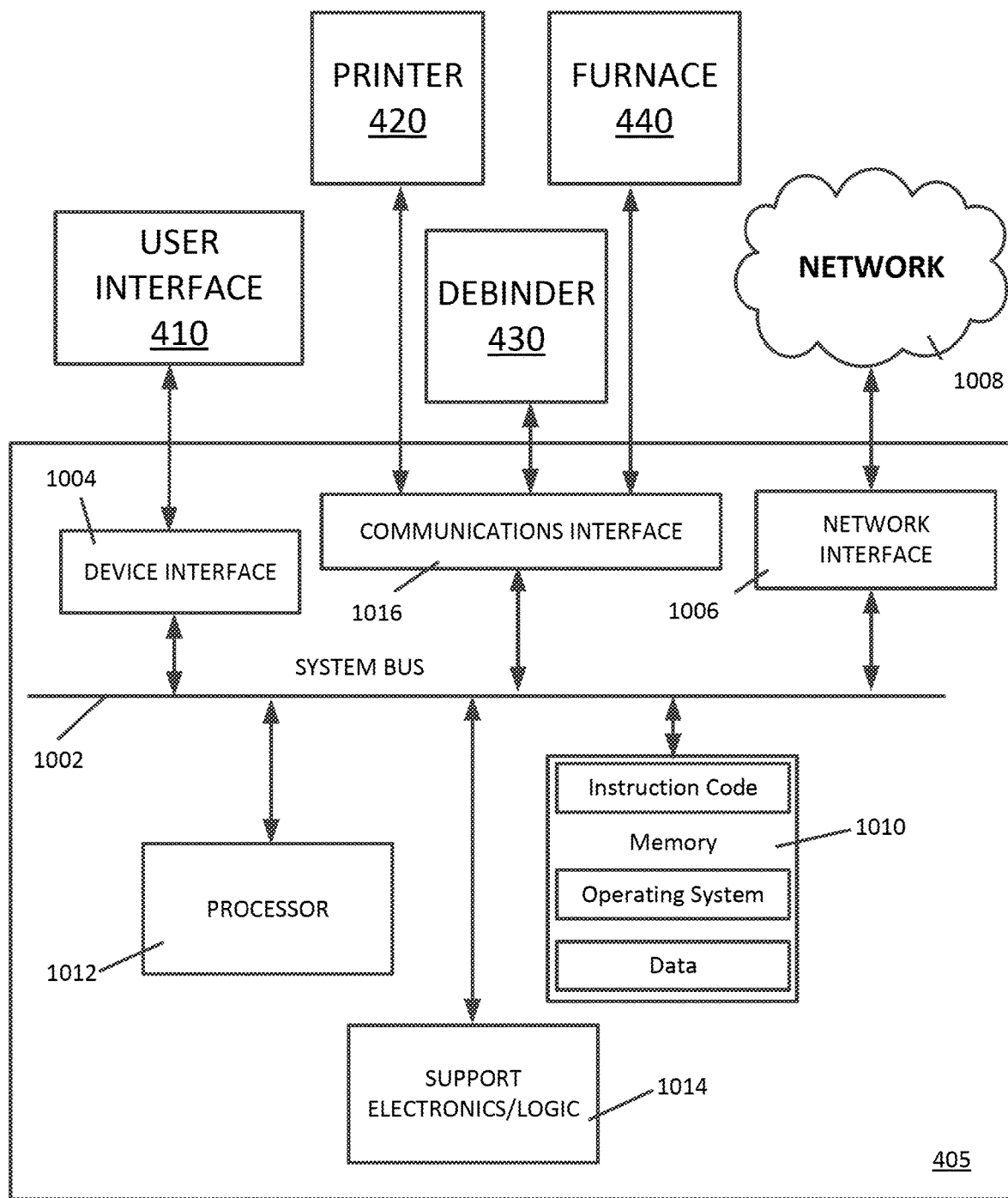
FIG. 17 is a block diagram of a processing system in which example embodiments may be implemented.

FIG. 17 is a diagram of an example internal structure of the process controller 405. As described above, the controller 405 may be implemented as a network server, workstation or off-site cloud service. As shown in FIG. 10, the controller 405 is implemented as a server in an example embodiment, where the printer 420, debinder 430, and furnace 440 are communicatively coupled to the process controller 405 via a local communications interface 316. Alternatively, the controller may communicate with the devices 410, 420, 430, 440 via a network 308 (e.g., a wired, wireless and/or cloud network).

The controller 405 may contain a system bus 1002, being a set of hardware lines used for data transfer among the components of a computer or processing system. Attached to the system bus 1002 is a user I/O device interface 1004 for connecting the user interface 410 and/or various input and output devices (e.g., keyboard, mouse, displays, printers, speakers, etc.) to the controller 405. A network interface 1006 allows the computer to connect to various other devices attached to the network 1008. Memory 1010 provides volatile and non-volatile storage for information such as computer software instructions used to implement one or more of the embodiments of the present invention described herein, for data generated internally and for data received from sources external to the controller 405. A central processor unit 1012 may also be attached to the system bus 1002, and provides for the execution of computer instructions stored in memory 1010. The controller 405 may also include support electronics/logic 1014.

In one embodiment, the information stored in memory 310 may comprise a computer program product, such that the memory 310 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection.

The process controller 405 may also include a distributed processing architecture, where processing elements at the printer 420, debinder 430 and/or furnace 440 perform portions of the control operations. The user interface 410 may comprise one or a plurality of devices in communication with the controller 405, such as a laptop, workstation, mobile device (e.g., smartphone, tablet), and/or or touch-screens integrated into the printer 420, debinder 430 and/or furnace 440.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware, it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While example embodiments have been particularly shown and described, it will be understood by those skilled in the art that various changes in form and details may be made therein without departing from the scope of the embodiments encompassed by the appended claims.

What is claimed is:

1. A method of determining a debinding time of a printed part or a model of a part, the method comprising:
receiving data about the printed part or the model of the part;

determining an effective thickness of the printed part or the model of the part by defining a series of shells within the printed part or the model of the part;

calculating a debinding time based on the effective thickness; and debinding the printed part for the debinding time.

2. The method of claim 1, wherein defining the series of shells within the printed part or the model of the part comprises:

producing a geometry of a shell corresponding to a displacement of an exterior surface of the printed part or the model of the part inward along a local normal vector of the exterior surface relative to a geometry of the printed part or the model of the part or any preceding reduced part.

3. The method of claim 2, further comprising:

repeating the steps of defining the series of shells within the printed part or the model of the part until an innermost reduced part, having either no interior volume or an interior volume below a threshold, is produced.

4. The method of claim 3, further comprising calculating a distance from an exterior surface of the part or the model of the part to an exterior surface of one of the shells; and determining the effective thickness based on the distance.

5. The method of claim 4, wherein calculating the distance from the exterior surface of the part or the model of the part to an exterior surface of one of the shells includes calculating distances from the exterior surface of the part or the model of the part to exterior surfaces of each of the reduced parts.

6. The method of claim 5, wherein a maximum of the calculated distances is equal to the effective thickness of the printed part or the model of the part.

7. The method of claim 5, wherein the distance from the innermost shell to the exterior surface of the printed part or the model of the part is a deepest point of the part or the model of the part, and wherein a distance from the deepest point to the exterior surface of the part or the model of the part is equal to the effective thickness of the printed part or the model of the part.

8. The method of claim 3, wherein intersecting or missing portions of the one or more shells are trimmed from the shell.

9. The method of claim 3, wherein, if a shell has a discontinuous geometry with two or more shapes that are not connected, the method includes repeating the steps of defining the series of shells within the printed part or the model of the part for the two or more shapes.

10. The method of claim 9, wherein the steps of defining the series of shells within the printed part or the model of the part for the two or more shapes are repeated until only one shape having an internal volume remains, and then further reducing the remaining shape with the internal volume until the remaining shape has no internal volume.

11. The method of claim 9, wherein the steps of defining the series of shells within the printed part or the model of the part for the two or more shapes are repeated until each of the two or more shapes are reduced to having no internal volume in a same cycle.

12. The method of claim 1, wherein calculating the debinding time based on the effective thickness includes raising the effective thickness to an exponent greater than or equal to 1 and less than or equal to 2.4.

13. The method of claim 1, wherein the printed part or the model of the part includes a plurality of printed parts or a plurality of models of parts, and wherein the effective thickness is determined for each of the plurality of parts or each of the plurality of models of parts, and wherein the debinding time is based on a greatest effective thickness.

14. A system for debinding a printed part, comprising:

a chamber configured to receive the printed part;

a storage chamber fluidly connected to the chamber and configured to store a debinding solution; and a controller configured to calculate a debinding time for the printed part or a model of a part, wherein calculating the debinding time includes:

determining an effective thickness of the printed part or the model of the part by defining a series of shells within the printed part or the model of the part, wherein the effective thickness is a distance from an innermost shell, having no internal volume or an internal volume below a threshold, to an exterior surface of the printed part or the model of the part; and calculating a debinding time based on the effective thickness.

15. The system of claim 14, wherein defining the series of reduced parts within the printed part or the model of the part comprises:

producing a geometry corresponding to a displacement of the exterior surface inward along a local normal vector of the exterior surface relative to a geometry of a preceding reduced part; and repeating the steps of defining the series of shells within the printed part or the model of the part until the innermost reduced part shell, having either no interior volume or an interior volume below a threshold, is produced.

16. The system of claim 14, wherein the printed part or the model of the part includes a plurality of printed parts or a plurality of models of parts, and wherein the controller is configured to determine the debinding time by determining a longest debinding time of the debinding times for each of the printed parts or the models of the parts.

17. The system of claim 14, further comprising:

a user interface, wherein the controller is configured to signal the user interface to display one or more indications of the debinding.

18. A non-transitory computer readable medium for use on a computer system containing computer-executable programming instructions for performing a method of determining a debinding time of a printed part or a model of a part, the method comprising:

receiving data about the printed part or the model of the part;

determining an effective thickness of the printed part or the model of the part by defining a series of shells within the printed part or the model of the part, wherein the effective thickness is equal to a distance from an innermost reduced part, having no internal volume or an internal volume below a threshold, to an exterior surface of the printed part or the model of the part; and calculating a debinding time based on the effective thickness.

19. The non-transitory computer readable medium of claim 18, wherein defining the series of shells within the printed part or the model of the part comprises:

producing a geometry corresponding to a displacement of the exterior surface inward along a local normal vector of the exterior surface relative to a geometry of a preceding shell; and repeating the steps of defining the series of shells within the printed part or the model of the part until the innermost reduced part, having either no interior volume or an interior volume below a threshold, is produced.

20. The non-transitory computer readable medium of claim 18, further comprising:

raising the effective thickness to a power having an exponent greater than or equal to 1 and less than or equal to 2.4; and calculating a time proportional to the effective thickness raised to the exponent.

* * * * *